US012596031B2

(12) United States Patent
He et al.

(10) Patent No.: US 12,596,031 B2
(45) Date of Patent: Apr. 7, 2026

(54) METHOD FOR DETERMINING NATURAL LIGHT DURATION, AND ELECTRONIC DEVICE

(71) Applicant: HUAWEI TECHNOLOGIES CO., LTD., Shenzhen (CN)

(72) Inventors: Chunyong He, Xi'an (CN); Nan Lu, Xi'an (CN); Jie Zhou, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 245 days.

(21) Appl. No.: 18/562,239

(22) PCT Filed: Mar. 29, 2022

(86) PCT No.: PCT/CN2022/083854
§ 371 (c)(1),
(2) Date: Nov. 17, 2023

(87) PCT Pub. No.: WO2022/247449
PCT Pub. Date: Dec. 1, 2022

(65) Prior Publication Data
US 2025/0052607 A1     Feb. 13, 2025

(30) Foreign Application Priority Data

May 27, 2021     (CN) .......................... 202110587712.8

(51) Int. Cl.
*G01J 1/42*          (2006.01)
(52) U.S. Cl.
CPC ......... *G01J 1/42* (2013.01); *G01J 2001/4266* (2013.01)
(58) Field of Classification Search
CPC .......................... G01J 1/42; G01J 2001/4266
See application file for complete search history.

(56) References Cited

U.S. PATENT DOCUMENTS 10,132,680 B1 * 11/2018 Isikman .................... G01J 1/18

FOREIGN PATENT DOCUMENTS

| CN | 103414825 A | 11/2013 |
| CN | 106323464 A | 1/2017 |

(Continued)

OTHER PUBLICATIONS

Hussain M Sazzad et al: "Tune your sun right persuasive app towards healthy and safe sun exposure", Education Technology and Computers, ACM, 2 Penn Plaza, Suite 701 New YorkNY1 0121-0701 USA, Nov. 28, 2017 (Nov. 28, 2017), pp. 361-365, XP059101284, total 5 pages.

*Primary Examiner* — Georgia Y Epps
*Assistant Examiner* — Don J Williams
(74) *Attorney, Agent, or Firm* — WOMBLE BOND DICKINSON (US) LLP

(57)          ABSTRACT

A method for determining natural illumination duration and an electronic device are provided, to more accurately determine a scenario in which a user is located and effectively determine natural illumination duration, to help the user improve vision. The method is applied to an electronic device having a display screen and includes: determining a current scenario based on a preset reference factor (S901), where the preset reference factor includes any one or more of ultraviolet intensity, illumination intensity, and locating signal strength; and counting current natural illumination duration towards cumulative natural illumination duration if the current scenario is a preset scenario (S902), where the preset scenario includes any one or more of an outdoor scenario, an indoor near-window scenario, and an outdoor blocked scenario.

20 Claims, 16 Drawing Sheets

---

Determine a current scenario based on a preset reference factor ⟋ S901

Count current natural illumination duration towards cumulative natural illumination duration if the current scenario is a preset scenario ⟋ S902

Display a first interface ⟋ S903

(56) References Cited

FOREIGN PATENT DOCUMENTS

| | | | |
|---|---|---|---|
| CN | 109029722 | A | 12/2018 |
| CN | 111522149 | A | 8/2020 |
| CN | 112750515 | A | 5/2021 |

* cited by examiner

810

METHOD FOR DETERMINING NATURAL LIGHT DURATION, AND ELECTRONIC DEVICE

CROSS-REFERENCE TO RELATED APPLICATIONS

This application is a national stage of International Application No. PCT/CN2022/083854 filed on Mar. 29, 2022, which claims priority to Chinese Patent Application No. 202110587712.8, filed on May 27, 2021. Both of the aforementioned applications are hereby incorporated by reference in their entireties.

TECHNICAL FIELD

This application relates to the field of electronic device technologies, and in particular, to a method for determining natural illumination duration and an electronic device.

BACKGROUND

According to scientific research, long enough exposure to natural light every day can help users improve vision. For adolescents, exposure to natural light for more than 60 minutes a day can effectively prevent myopia. At present, some electronic devices may identify whether a user is indoors or outdoors by using a location function, a weather service, ambient temperature collection, ambient illumination intensity collection, or other methods. However, according to the foregoing methods, the electronic devices cannot accurately determine daily natural illumination duration of the user. For example, even if the user is indoors, the user may be exposed to natural light by a window in a south-facing room with sufficient sunlight. Therefore, to help a user improve vision, how to accurately determine a scenario in which the user is located and effectively determine natural illumination duration is an urgent problem to be resolved.

SUMMARY

This application provides a method for determining natural illumination duration and an electronic device, to more accurately determine a scenario in which a user is located and effectively determine natural illumination duration, to help the user improve vision.

To achieve the foregoing objective, the following technical solutions are used in this application.

According to a first aspect, this application provides a method for determining natural illumination duration, applied to an electronic device having a display screen. The method includes: determining a current scenario based on a preset reference factor, where the preset reference factor includes any one or more of ultraviolet intensity, illumination intensity, and locating signal strength; and counting current natural illumination duration towards cumulative natural illumination duration if the current scenario is a preset scenario. The preset scenario includes any one or more of an outdoor scenario, an indoor near-window scenario, and an outdoor blocked scenario.

According to the foregoing technical solution, in this application, the electronic device determines the current scenario based on the preset reference factor, where the preset reference factor includes any one or more of the ultraviolet intensity, the illumination intensity, and the locating signal strength. When the scenario is the preset scenario, the current natural illumination duration is counted towards the cumulative natural illumination duration, where the preset scenario includes any one or more of the outdoor scenario, the indoor near-window scenario, and the outdoor blocked scenario. In this way, a scenario in which a user is located can be more accurately determined, and natural illumination duration can be effectively determined, to help the user improve vision.

In one embodiment, the method further includes: displaying a first interface on the display screen, where the first interface includes the cumulative natural illumination duration. Based on the embodiment, a user may view the current natural illumination duration in the first interface.

In one embodiment, the method further includes: determining whether the cumulative natural illumination duration is less than preset duration; and displaying reminder information on the display screen if the cumulative natural illumination duration is less than the preset duration, where the reminder information is used to remind a user to do an outdoor activity. Based on the embodiment, when the cumulative natural illumination duration is less than the preset duration, the reminder information reminding an outdoor activity is displayed, to further help the user improve vision.

In one embodiment, the preset reference factor includes the ultraviolet intensity, and that the current scenario in which the electronic device is located is determined based on the preset reference factor specifically includes: determining whether ultraviolet intensity at a current location of the electronic device is greater than or equal to a first threshold; and if the ultraviolet intensity is greater than or equal to the first threshold, determining that the electronic device is currently in the outdoor scenario, where the first threshold is a preset ultraviolet intensity threshold.

Based on the embodiment, when the ultraviolet intensity at the current location is greater than or equal to the first threshold, it may be determined that the user is currently in the outdoor scenario, indicating that the user is currently exposed to natural light. Therefore, as duration of natural illumination on the user is counted towards the cumulative natural illumination duration, a scenario in which the user is located can be accurately determined, and the natural illumination duration can be effectively determined, to help the user improve vision.

In one embodiment, the preset reference factor includes the illumination intensity, and that the current scenario in which the electronic device is located is determined based on the preset reference factor specifically includes: determining whether illumination intensity at the current location of the electronic device is greater than or equal to a second threshold; and if the illumination intensity is greater than or equal to the second threshold, determining that the electronic device is currently in the outdoor scenario, where the second threshold is a preset illumination intensity threshold.

Based on the embodiment, when the illumination intensity at the current location is greater than or equal to the second threshold, it may be determined that the user is currently in the outdoor scenario, indicating that the user is currently exposed to natural light. Therefore, as duration of natural illumination on the user is counted towards the cumulative natural illumination duration, a scenario in which the user is located can be accurately determined, and the natural illumination duration can be effectively determined, to help the user improve vision.

In one embodiment, the preset reference factor includes the ultraviolet intensity and the illumination intensity, and that the current scenario in which the electronic device is located is determined based on the preset reference factor specifically includes: determining whether the ultraviolet intensity at the current location of the electronic device is greater than or equal to a third threshold and whether the illumination intensity at the current location of the electronic device is greater than or equal to a fourth threshold, where the third threshold is a preset ultraviolet intensity threshold, the third threshold is less than the first threshold, the fourth threshold is a preset illumination intensity threshold, and the fourth threshold is less than the second threshold; and if the ultraviolet intensity is greater than or equal to the third threshold, and the illumination intensity is greater than or equal to the fourth threshold, determining that the electronic device is currently in the indoor near-window scenario; or if the ultraviolet intensity is less than the third threshold and/or the illumination intensity is less than the fourth threshold, determining that the electronic device is currently in an indoor scenario without natural illumination.

Based on the embodiment, when the ultraviolet intensity at the current location is greater than or equal to the third threshold and the illumination intensity at the current location is greater than or equal to the fourth threshold, it may be determined that the user is currently in the indoor near-window scenario, indicating that the user is currently exposed to natural light. Therefore, as duration of natural illumination on the user is counted towards the cumulative natural illumination duration, a scenario in which the user is located can be accurately determined, and the natural illumination duration can be effectively determined, to help the user improve vision.

In one embodiment, the preset reference factor includes the locating signal strength, and that the current scenario in which the electronic device is located is determined based on the preset reference factor specifically includes: determining whether locating signal strength at the current location of the electronic device is greater than or equal to a fifth threshold, where the fifth threshold is a preset locating signal strength threshold; and if the locating signal strength is greater than or equal to the fifth threshold, determining that the electronic device is currently in the outdoor scenario.

Based on the embodiment, a scenario in which a user is located can be identified based on the locating signal strength. When the locating signal strength at the current location is greater than or equal to the fifth threshold, it may be determined that the user is currently in the outdoor scenario, indicating that the user is currently exposed to natural light. Therefore, as duration of natural illumination on the user is counted towards the cumulative natural illumination duration, a scenario in which the user is located can be accurately determined, and the natural illumination duration can be effectively determined, to help the user improve vision.

In one embodiment, the preset reference factor includes the locating signal strength, and that the current scenario in which the electronic device is located is determined based on the preset reference factor specifically includes: determining whether the locating signal strength at the current location of the electronic device is less than the fifth threshold and greater than or equal to a sixth threshold; and if the locating signal strength is less than the fifth threshold and greater than or equal to the sixth threshold, determining that the electronic device is currently in the indoor near-window scenario, where the sixth threshold is a preset locating signal strength threshold, and the sixth threshold is less than the fifth threshold; or if the locating signal strength is less than the sixth threshold, determining that the electronic device is currently in an indoor scenario without natural illumination.

Based on the embodiment, a scenario in which a user is located can be identified based on the locating signal strength. When the locating signal strength at the current location is less than the fifth threshold and greater than or equal to the sixth threshold, it may be determined that the user is currently in the indoor near-window scenario, indicating that the user is currently exposed to natural light. Therefore, as duration of natural illumination on the user is counted towards the cumulative natural illumination duration, a scenario in which the user is located can be accurately determined, and the natural illumination duration can be effectively determined, to help the user improve vision.

In one embodiment, the preset reference factor includes the ultraviolet intensity, the illumination intensity, and the locating signal strength, and that the current scenario in which the electronic device is located is determined based on the preset reference factor specifically includes: determining whether the ultraviolet intensity at the current location of the electronic device is less than the first threshold, whether the illumination intensity at the current location of the electronic device is less than the second threshold, and whether the locating signal strength at the current location of the electronic device is greater than or equal to the fifth threshold; and if the ultraviolet intensity is less than the first threshold, the illumination intensity is less than the second threshold, and the locating signal strength is greater than or equal to the fifth threshold, determining that the electronic device is currently in the outdoor blocked scenario.

It should be understood that the outdoor blocked scenario is a scenario in which an object blocks the electronic device and is referred to as a blocked scenario in this application. The object may be a sleeve, a school bag, or another item. This is not limited in this application. In real life, in the outdoor blocked scenario, measured ultraviolet intensity and illumination intensity may be less than an actual value. Based on the embodiment, the locating signal strength is used to help identify a scenario in which a user is located, and when it is determined that the user is currently in the outdoor blocked scenario, it indicates that the user is exposed to natural light as well. Therefore, as duration of natural illumination on the user is counted towards the cumulative natural illumination duration, a scenario in which the user is located can be accurately determined, and the natural illumination duration can be effectively determined, to help the user improve vision.

In one embodiment, a locating signal is any one or more of a global positioning system GPS signal and a BeiDou signal.

In one embodiment, before the current scenario is determined based on the preset reference factor, the method further includes: determining sunrise time T1 and sunset time T2 at the location; and determining whether current system time T is greater than or equal to T1 and less than or equal to T2. Based on the embodiment, the electronic device determines natural illumination duration only after determining that the current time is within daylight hours on a current day, so that power consumption of the electronic device can be reduced.

According to a second aspect, an embodiment of this application provides an electronic device, including a processor, a memory, and a display screen. The memory and the display screen are coupled to the processor, the memory is configured to store computer program code, the computer program code includes computer instructions, and when the processor reads the computer instructions from the memory, the electronic device is enabled to perform the method according to any one of the first aspect and the embodiments in the first aspect.

According to a third aspect, an embodiment of this application provides an electronic device. The electronic device has a function for implementing the method according to any one of the first aspect and the embodiments in the first aspect. The function may be implemented by hardware, or may be implemented by hardware executing corresponding software. The hardware or the software includes one or more modules corresponding to the foregoing function.

According to a fourth aspect, an embodiment of this application provides a computer-readable storage medium. The computer-readable storage medium stores a computer program or instructions, and when the computer program or the instructions is/are run on a computer, the computer is enabled to perform the method according to any one of the first aspect and the embodiments in the first aspect.

According to a fifth aspect, an embodiment of this application provides a computer program product. The computer program product includes a computer program or instructions, and when the computer program or the instructions is/are run on a computer, the computer is enabled to perform the method according to any one of the first aspect and the embodiments in the first aspect.

According to a sixth aspect, an embodiment of this application provides a chip system, including at least one processor and at least one interface circuit. The at least one interface circuit is configured to perform a transceiver function and send an instruction to the at least one processor. When the at least one processor executes the instruction, the at least one processor performs the method according to any one of the first aspect and the embodiments in the first aspect.

It should be noted that, for technical effect brought by any design in the second aspect to the sixth aspect, refer to technical effect brought by a corresponding design in the first aspect. Details are not described herein again.

DESCRIPTION OF EMBODIMENTS

Figure 1:
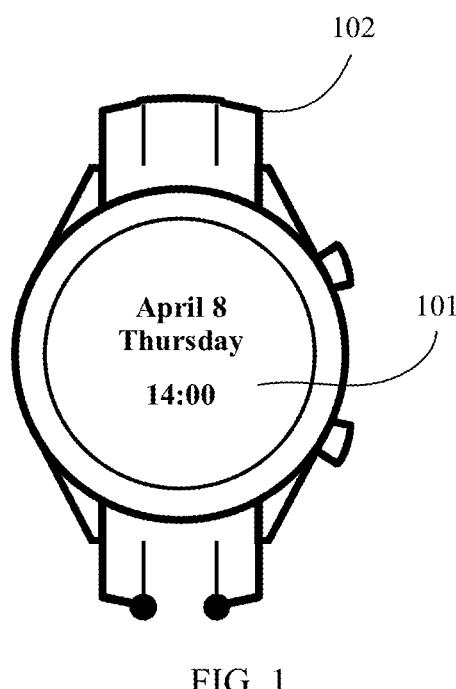
FIG. 1 is a schematic diagram of a structure of an electronic device according to an embodiment of this application.

With reference to the accompanying drawings, a method for determining natural illumination duration and an electronic device that are provided in embodiments of this application are described below in detail.

The terms "include", "have", or any other variant thereof in descriptions of this application are intended to cover a non-exclusive inclusion. For example, a procedure, a method, a system, a product, or a device that includes a series of steps or units is not limited to the steps or units listed above, and in one embodiment, further includes another step or unit that is not listed herein, or in one embodiment, further includes another step or unit inherent for the procedure, the method, the product, or the device.

It should be noted that, in embodiments of this application, "example", "for example", or the like is used to represent giving an example, an illustration, or a description. Any embodiment or design scheme described as an "example" or with "for example" in embodiments of this application should not be explained as being more preferred or having more advantages than another embodiment or design scheme. Precisely, use of "example", "for example", or the like is intended to present a relative concept in a specific manner.

In the descriptions of this application, unless otherwise stated, "a plurality of" means two or more. The term "and/or" in this specification describes only an association relationship for describing associated objects and represents that three relationships may exist. For example, A and/or B may represent the following three cases: Only A exists, both A and B exist, and only B exists.

For ease of understanding, related terms and concepts that may be involved in embodiments of this application are first described below.

(1) Ultraviolet (UV)

Ultraviolet light is sunlight that has a wavelength of 0.01 microns to 0.4 microns. Ultraviolet light can be divided into three parts by wavelengths: ultraviolet A that has a wavelength ranging from 0.32 microns to 0.40 microns; ultraviolet B that has a wavelength ranging from 0.28 microns to 0.32 microns; and ultraviolet C that has a wavelength ranging from 0.01 microns to 0.28 microns.

(2) Ultraviolet index (UVI)

Ultraviolet index may also be referred to as ultraviolet intensity, and ultraviolet index describes an ultraviolet radiation level on the surface of the earth.

(2) Illumination Intensity

Illumination intensity may also be referred to as illuminance for short. Illumination intensity is a physics term and means luminous flux of visible light received per unit area. The unit of illumination intensity is lux (lux or lx) and indicates intensity of light and a value of a degree of illumination on a surface area of an object.

Most electronic devices (for example, wearables such as a band, a watch, and smart glasses) have a positioning function. For example, technologies such as a global positioning system (GPS), BeiDou, and network positioning may be used, and after the positioning function is enabled, current geographic locations of the electronic devices may be determined, and it may be determined, based on the geographic location, that a user is indoors or outdoors. Alternatively, an electronic device may obtain, by using a weather service, an outdoor temperature corresponding to a current geographic location, collect a temperature of an environment in which the electronic device is located, and determine a difference between the outdoor temperature and the ambient temperature. When the difference is less than a preset threshold, it may be determined that a user is in an outdoor environment. When the difference is greater than or equal to the preset threshold, it may be determined that the user is in an indoor environment. Alternatively, the electronic device may further collect light information of an environment in which the electronic device is located, to obtain ultraviolet intensity and illumination intensity, and determine that a user is in an indoor or outdoor environment based on the ultraviolet intensity and the illumination intensity.

However, the foregoing solution does not take into account various types of scenarios that a user may encounter in life, and is applicable only to some specific scenarios. As a result, whether the user is indoors or outdoors cannot be completely accurately determined, and duration of natural illumination on the user cannot be accurately determined either. Generally, there is no large difference between indoor and outdoor temperatures. Only when an indoor temperature is intervened by human, for example, when an air conditioner and/or a heating machine is turned on indoors in winter or an air conditioner is turned on indoors in summer, a difference between indoor and outdoor temperatures is relatively large. Only in this case, whether a user is indoors or outdoors can be determined by using the foregoing solution of determining a difference between indoor and outdoor temperatures.

Therefore, to resolve the foregoing technical problem, embodiments of this application provide a method for determining natural illumination duration and an electronic device. The electronic device determines a current scenario based on a preset reference factor. The preset reference factor includes any one or more of ultraviolet intensity, illumination intensity, and locating signal strength. When the scenario is a preset scenario, as current natural illumination duration is counted towards cumulative natural illumination duration, a scenario in which a user is located can be more accurately determined, and the natural illumination duration can be effectively determined, to help the user improve vision.

The method for determining natural illumination duration provided in embodiments of this application may be applied to an electronic device 100, or may be applied to a system including the electronic device 100.

In one embodiment, the electronic device 100 may be a mobile phone, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device, a virtual reality (VR) device, an artificial intelligence (AI) device, or a wearable. The wearable includes but is not limited to a smart watch, a smart band, a smart foot-band, a wireless headset, smart glasses, a smart helmet, a glucose meter, a sphygmomanometer, and the like. A specific type of the electronic device 100 is not limited in embodiments of this application.

An example in which the electronic device 100 is a wearable is used below for description.

For example, FIG. 1 is a schematic diagram of a structure of an electronic device 100. The electronic device 100 may be worn on a wrist of a user. The electronic device 100 includes a display screen 101 and a fixing strap 102. The display screen 101 is configured to display time and for a user to touch to display other related content. The fixing strap 102 is configured to hold the electronic device 100 to the wrist of the user.

Figure 2:
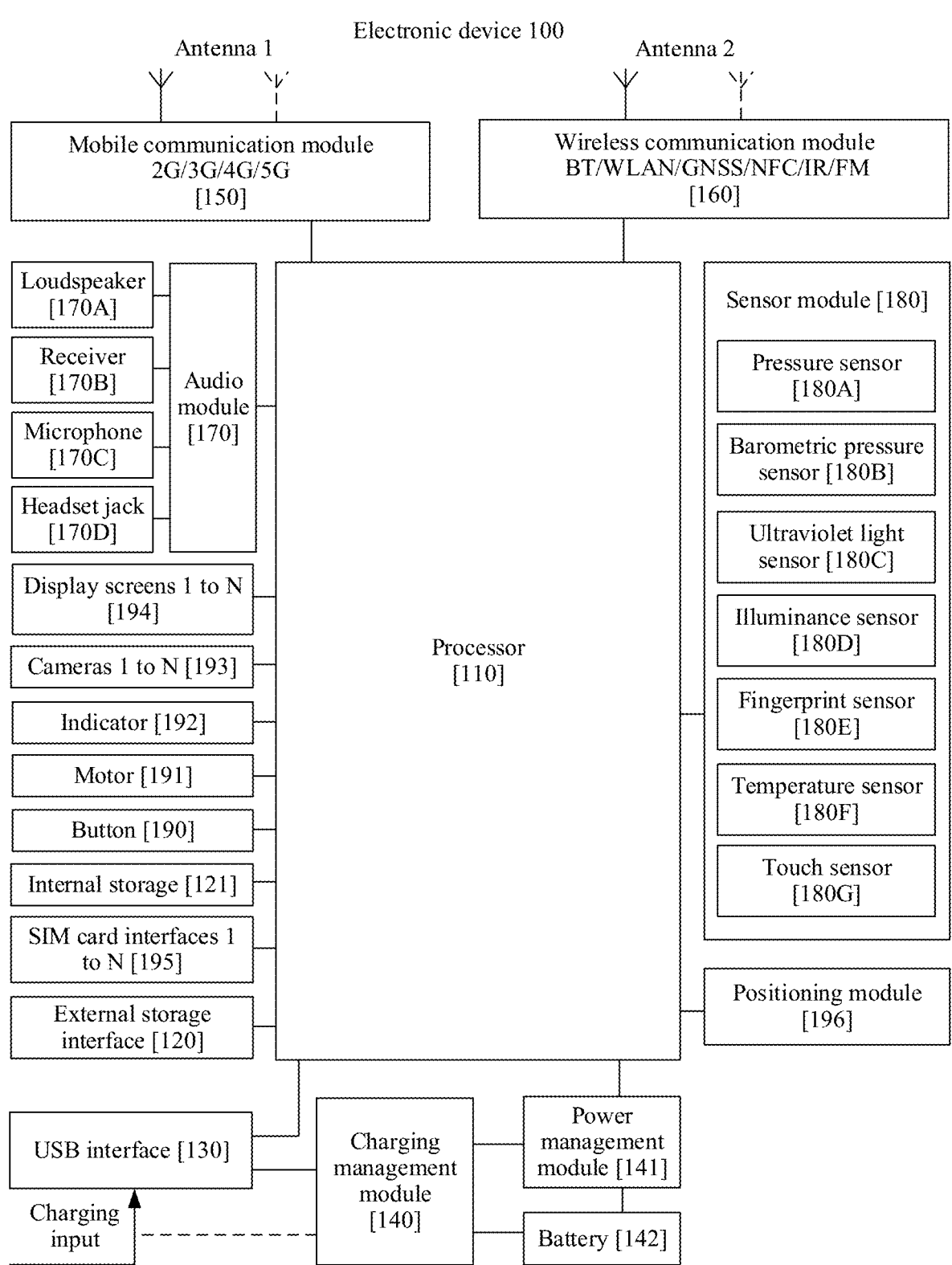
FIG. 2 is a schematic diagram of a hardware structure of an electronic device according to an embodiment of this application.

For example, FIG. 2 is a schematic diagram of a hardware structure of the electronic device 100.

The electronic device 100 may include a processor 110, an external storage interface 120, an internal storage 121, a universal serial bus (USB) interface 130, a charging management module 140, a power management module 141, a battery 142, an antenna 1, an antenna 2, a mobile communication module 150, a wireless communication module 160, an audio module 170, a loudspeaker 170A, a receiver 170B, a microphone 170C, a headset jack 170D, a sensor module 180, a button 190, a motor 191, an indicator 192, a camera 193, a display screen 194, a subscriber identification module (SIM) card interface 195, a positioning module 196, and the like. The sensor module 180 may include a pressure sensor 180A, a barometric pressure sensor 180B, an ultraviolet light sensor 180C, an illuminance sensor 180D, a fingerprint sensor 180E, a temperature sensor 180F, a touch sensor 180G, and the like.

It can be understood that the structure shown in this embodiment of the present disclosure does not constitute a specific limitation on the electronic device 100. In some other embodiments of this application, the electronic device 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store an instruction and data. In some embodiments, the memory in the processor 110 is a cache memory. The memory may store instructions or data that has just been used or is cyclically used by the processor 110. If the processor 110 needs to use the instructions or the data again, the processor may directly invoke the instruction or the data from the memory. This avoids repeated access, reduces a time for waiting of the processor 110, and improves system efficiency.

In some embodiments, the processor 110 may include one or more interfaces. The interface may include an inter-integrated circuit (2C) interface, an inter-integrated circuit sound (inter-integrated circuit sound, I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be used for audio communication, with analog signal sampling, quantization, and coding. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communication bus. The bus converts between serial communication and parallel communication for data to be transmitted. In some embodiments, the UART interface is usually used to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be used to connect the processor 110 to a peripheral component, for example, the display screen 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display screen 194 through the DSI, to implement a display function of the electronic device 100.

The GPIO interface may be configured by using software. The GPIO interface may be configured with a control signal, or may be configured with a data signal. In some embodiments, the GPIO interface may be used to connect the processor 110 to the camera 193, the display screen 194, the wireless communication module 160, the audio module 170, the sensor module 180, and the like. The GPIO interface may be further configured as an I2C interface, an I2S interface, a UART interface, a MIPI, or the like.

The USB interface 130 is an interface that conforms to a USB standard specification, and may be specifically a mini-USB interface, a micro-USB interface, a USB Type-C interface, or the like. The USB interface 130 may be used to connect to a charger to charge the electronic device 100, or may be used to transmit data between the electronic device 100 and a peripheral device, or may be used to connect to a headset for playing audio through the headset. The interface may be further used to connect to another electronic device, for example, an AR device.

It can be understood that an interface connection relationship between the modules that is shown in this embodiment of the present disclosure is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the electronic device 100. The charging management module 140 supplies power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal storage 121, the display screen 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may be alternatively disposed in a same component.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further reused, to improve antenna utilization. For example, the antenna 1 may be reused as a diversity antenna in a wireless local area network. In some other embodiments, the antenna may be used in combination with a tuning switch.

The mobile communication module 150 may provide a wireless communication solution including 2G/3G/4G/5G that is applied to the electronic device 100. The mobile communication module 150 may include at least one filter, a switch, a power amplifier, a low noise amplifier (LNA), and the like. The mobile communication module 150 may receive an electromagnetic wave through the antenna 1, perform processing, for example, filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least a part of functional modules of the mobile communication module 150 may be disposed in the processor 110. In some embodiments, at least a part of functional modules of the mobile communication module 150 and at least a part of modules of the processor 110 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal that is then transferred to the application processor. The application processor outputs a sound signal through an audio device (that is not limited to the loudspeaker 170A, the receiver 170B, and the like), or displays an image or a video by using the display screen 194. In some embodiments, the modem processor may be an independent component. In some other embodiments, the modem processor may be independent of the processor 110, and is disposed with the mobile communication module 150 or another functional module in the same device.

The wireless communication module 160 may provide a wireless communication solution that is applied to the electronic device 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like. The wireless communication module 160 may be one or more components integrating at least one communication processor module. The wireless communication module 160 receives an electromagnetic wave through the antenna 2, performs frequency modulation and filtering on an electromagnetic wave signal, and sends a processed signal to the processor 110. The wireless communication module 160 may further receive a signal, that is to be transmitted, from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time division-synchronous code division multiple access (TD-SCDMA), long term evolution (LTE), BT, a GNSS, a WLAN, NFC, FM, IR, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The electronic device 100 may implement a display function by using the GPU, the display screen 194, the application processor, and the like. The GPU is a microprocessor for image processing, and is connected to the display screen 194 and the application processor. The GPU is configured to: perform mathematical and geometric computation, and render an image. The processor 110 may include one or more GPUs that execute a program instruction to generate or change display information.

The display screen 194 is configured to display an image, a video, or the like. The display screen 194 includes a display panel. The display panel may use a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), and the like. In some embodiments, the electronic device 100 may include one or N display screens 194, and N is a positive integer greater than 1.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature in a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more types of video codecs. Therefore, the electronic device 100 may play or record videos in a plurality of encoding formats, for example, moving picture experts group (MPEG)-1, MPEG-2, MPEG-3, and MPEG-4.

The external storage interface 120 may be used to connect to an external storage card, for example, a micro SD card, to extend a storage capability of the electronic device 100. The external storage card communicates with the processor 110 through the external storage interface 120, to implement a data storage function. For example, files such as music and a video are stored in the external storage card.

The internal storage 121 may be configured to store computer-executable program code. The executable program code includes an instruction. The internal storage 121 may include a program storage area and a data storage area. The program storage area may store an operating system, an application required for at least one function (for example, a sound play function or an image play function), and the like. The data storage area may store data (for example, audio data and an address book) and the like that are created during use of the electronic device 100. In addition, the internal storage 121 may include a high-speed random access memory, and may further include a non-volatile memory, for example, at least one magnetic disk storage device, a flash storage device, or a universal flash storage (UFS). The processor 110 runs the instruction stored in the internal storage 121 and/or an instruction stored in the memory disposed in the processor, to implement various function applications and data processing of the electronic device 100.

The electronic device 100 may implement an audio function, for example, music play or recording, by using the audio module 170, the loudspeaker 170A, the receiver 170B, the microphone 170C, the headset jack 170D, the application processor, and the like.

The audio module 170 is configured to convert digital audio information into an analog audio signal for output, and is further configured to convert an analog audio input into a digital audio signal. The audio module 170 may be further configured to encode and decode an audio signal. In some embodiments, the audio module 170 may be disposed in the processor 110, or a part of functional modules of the audio module 170 are disposed in the processor 110.

The loudspeaker 170A, also referred to as a "speaker", is configured to convert an electrical audio signal into a sound signal. The electronic device 100 may receive music or receive a hands-free call by using the loudspeaker 170A.

The receiver 170B, also referred to as an "earpiece", is configured to convert an electrical audio signal into a sound signal. When a call or audio information is received by the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may move the mouth close to the microphone 170C and make a sound, to input a sound signal to the microphone 170C. At least one microphone 170C may be disposed in the electronic device 100. In some other embodiments, two microphones 170C may be disposed in the electronic device 100, to collect a sound signal and further reduce noises. In some other embodiments, three, four, or more microphones 170C may alternatively be disposed in the electronic device 100, to collect a sound signal, reduce noises, and identify a sound source, to implement a directional sound recording function and the like.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA of the USA) standard interface.

The pressure sensor 180A is configured to sense a pressure signal, and may convert the pressure signal into an electrical signal. In some embodiments, the pressure sensor 180A may be disposed in the display screen 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a pressure is applied to the pressure sensor 180A, capacitance between electrodes changes. The electronic device 100 determines pressure intensity based on a capacitance change. When a touch operation is performed on the display screen 194, the electronic device 100 detects strength of the touch operation by using the pressure sensor 180A. The electronic device 100 may calculate a touch position based on a detection signal from the pressure sensor 180A.

The barometric pressure sensor 180B is configured to measure barometric pressure. In some embodiments, the electronic device 100 calculates an altitude based on a value of the barometric pressure measured by the barometric pressure sensor 180C, to help with positioning and navigation.

The ultraviolet light sensor 180C may convert an ultraviolet light signal into an electrical signal by using a photosensitive element. A working mode of the ultraviolet light sensor is usually divided into a photovoltaic mode and a photoconductive mode. The photovoltaic mode means that the ultraviolet light sensor 180C does not need to be connected to a battery in series, and there is a current in a series resistor. The ultraviolet light sensor 180C is equivalent to a small battery and outputs a voltage. The photosensitive mode means that the ultraviolet light sensor 180C needs to be connected to a battery in series to work. The ultraviolet light sensor 180C is equivalent to a resistor, and a resistance changes as light intensity changes. In some embodiments, the ultraviolet light sensor 180C is configured to collect ultraviolet intensity. The electronic device 100 compares the ultraviolet intensity collected by the ultraviolet light sensor 180C with a first threshold. When determining that the ultraviolet intensity is greater than or equal to the first threshold, the electronic device considers that a user is currently exposed to natural light, and duration of current natural illumination on the user is counted towards cumulative natural illumination duration.

The illuminance sensor 180D may be configured to detect illumination intensity, and may convert a collected illumination intensity value into a voltage value. For example, in summer, with direct illumination of sunlight, illumination intensity may reach 60,000 lx to 100,000 lx, and outdoor illumination intensity with little sunlight may reach lx 1,000 to 10,000 lx. In summer, illumination intensity in a sunny indoor space reaches 100 lx to 550 lx, and illumination intensity reaches 0.2 lx at full moon nights. In some embodiments, the illuminance sensor 180D is configured to collect illumination intensity. The electronic device 100 compares the illumination intensity collected by the illuminance sensor 180D with a second threshold. When determining that the illumination intensity is greater than or equal to the second threshold, the electronic device considers that a user is currently exposed to natural light, and duration of current natural illumination on the user is counted towards the cumulative natural illumination duration.

The fingerprint sensor 180E is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180F is configured to detect a temperature. In some embodiments, the electronic device 100 executes a temperature processing policy based on the temperature detected by the temperature sensor 18F. For example, when a temperature reported by the temperature sensor 180J exceeds a threshold, the electronic device 100 lowers performance of a processor near the temperature sensor 180F, to reduce power consumption and provide thermal protection. In some other embodiments, when the temperature is less than another threshold, the electronic device 100 heats up the battery 142 to prevent the electronic device 100 from being shut down anomalously due to a low temperature. In some other embodiments, when the temperature is less than still another threshold, the electronic device 100 boosts an output voltage of the battery 142 to avoid anomalous shutdown due to a low temperature.

The touch sensor 180G may also be referred to as a "touchscreen device". The touch sensor 180G may be disposed on the display screen 194. The touch sensor 180G and the display screen 194 form a touchscreen, which is also referred to as a "touch screen". The touch sensor 180G is configured to detect a touch operation performed on or near the touch sensor. The touch sensor may transfer a detected touch operation to the application processor to determine a type of the touch event. A visual output related to the touch operation may be provided through the display screen 194. In some other embodiments, the touch sensor 180G may be alternatively disposed on a surface of the electronic device 100, and is located at a position different from that of the display screen 194.

In one embodiment, the sensor module 180 may further include a gyroscope sensor, a magnetic sensor, an acceleration sensor, a distance sensor, an optical proximity sensor, an ambient light sensor, a bone conduction sensor, and the like.

The button 190 includes a power button, a volume button, and the like. The button 190 may be a mechanical button, or may be a touch button. The electronic device 100 may receive a button input, and generate a button signal input related to user settings and function control of the electronic device 100.

The motor 191 may generate a vibration prompt. The motor 191 may be configured to produce an incoming call vibration prompt, and may be configured to provide touch vibration feedback. For example, touch operations performed for different applications (for example, taking a picture and playing audio) may correspond to different vibration feedback effects. For touch operations performed on different areas of the display screen 194, the motor 191 may also correspond to different vibration feedback effects. Different application scenarios (for example, time reminding, information receiving, an alarm clock, and a game) may also correspond to different vibration feedback effects. A touch vibration feedback effect may be further customized.

The indicator 192 may be an indicator light, may be configured to indicate a charging status and a power change, and may be configured to indicate a message, a missed call, a notification, and the like.

The SIM card interface 195 is used to connect a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or of different types. The SIM card interface 195 is compatible with different types of SIM cards. The SIM card interface 195 is also compatible with an external storage card. The electronic device 100 interacts with a network by using the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

The positioning module 196 may be configured to locate the electronic device 100. For example, the positioning module 196 may be a GPS module, a BeiDou module, or the like. The positioning module 196 is not specifically limited in this application. In some embodiments, the positioning module 196 is configured to determine locating signal strength. The locating signal strength may be used to indicate a scenario in which the electronic device 100 is located, for example, indoor without natural illumination, indoor near-window, outdoor, or outdoor blocked. The electronic device 100 may determine natural illumination duration based on the locating signal intensity determined by the positioning module 196. In some embodiments, the electronic device 100 compares the locating signal strength with a fifth threshold and/or a sixth threshold. When determining that the locating signal strength is greater than or equal to the fifth threshold, the electronic device considers that a user is outdoors and is currently exposed to natural light, and counts duration of current natural illumination on the user to the cumulative natural illumination duration. When determining that the locating signal intensity is less than the fifth threshold and greater than or equal to the sixth threshold, the electronic device considers that the user is currently indoors near a window and is currently exposed to natural light, and counts duration of current natural illumination on the user towards the cumulative natural illumination duration. When determining that the locating signal strength is less than the sixth threshold, the electronic device considers that the user is currently indoors and is not exposed to natural light, and the current natural illumination duration is not counted towards the cumulative natural illumination duration.

A software system on the electronic device 100 may use a layered architecture, an event-driven architecture, a microkernel architecture, a micro service architecture, or a cloud architecture. In this embodiment of the present disclosure, an Android system with a layered architecture is used as an example to describe a software structure of the electronic device 100.

Figure 3:
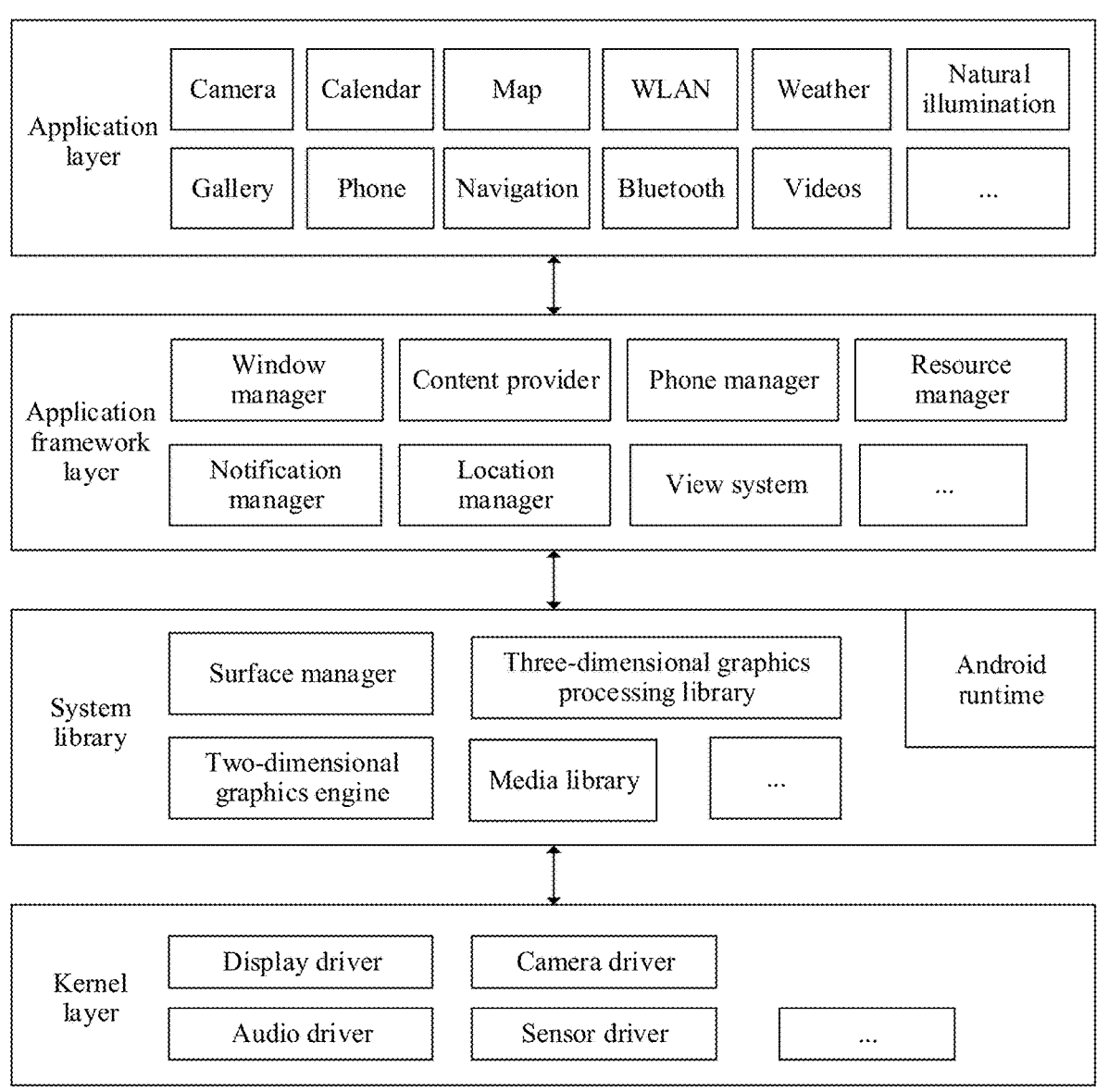
FIG. 3 is a block diagram of a software structure of an electronic device according to an embodiment of this application.

FIG. 3 is a block diagram of a software structure of the electronic device 100 according to an embodiment of the present disclosure.

In the layered architecture, software is divided into several layers, and each layer has a clear-cut role and task. The layers communicate with each other through a software interface. In some embodiments, the Android system is divided from top to bottom into four layers: an application layer, an application framework layer, Android runtime, and a system library, and a kernel layer.

The application layer may include a series of application packages.

As shown in FIG. 3, an application package may include applications such as Camera, Gallery, Calendar, Phone, Maps, Navigation, WLAN, Bluetooth, Weather, Videos, and Natural illumination.

Natural illumination is an application that is provided in embodiments of this application and that is used to identify natural illumination duration, and is referred to as "Natural illumination" in this specification. It should be noted that "Natural illumination" is merely a name, and does not constitute a limitation on a function of the application. There may alternatively be another name. This is not limited in this application.

The application framework layer provides an application programming interface (API) and a programming framework to an application at the application layer. The application framework layer includes some predefined functions.

As shown in FIG. 3, the application framework layer may include a window manager, a content provider, a view system, a phone manager, a resource manager, a notification manager, a location manager, and the like.

The window manager is used to manage a window program. The window manager may obtain a size of a display screen, determine whether there is a status bar, lock the screen, take a screenshot, and the like.

The content provider is used to store and obtain data, and enable the data to be accessed by an application. The data may include a video, an image, audio, outgoing and incoming calls, a browsing history and bookmarks, contacts, and the like.

The view system includes a visual control, for example, a control for displaying text and a control for displaying an image. The view system may be used to construct an application. A display interface may include one or more views. For example, a display interface including a notification icon of Messages may include a text display view and a picture display view.

The phone manager is used to provide a communication function of the electronic device 100, for example, management of a call status (including answering, hanging up, and the like).

The resource manager provides, to an application, various resources, such as a localized character string, an icon, a picture, a layout file, and a video file.

The notification manager enables an application to display notification information in the status bar, and may be used to transmit a notification-type message. The displayed information may automatically disappear after a short pause without user interaction. For example, the notification manager is used to notify download completion, provide a message notification, and the like. The notification manager may alternatively be a notification that appears in a status bar atop the system in a form of a graph or a scroll bar text, for example, a notification of an application run on the background, or may be a notification that appears on the screen in a form of a dialog window. For example, text information is prompted in the status bar, a prompt tone is played, the electronic device vibrates, or the indicator light blinks.

The location manager is configured to provide a location service for the electronic device 100. A location manager system service is a core component of the location service, and provides a series of methods to handle location-related issues, including search for a previous known location, registration and deregistration of periodic location updates from a component that has a location provider function, and registration and deregistration of triggering a defined intent when approaching a specific coordinate.

Android runtime includes a core library and a virtual machine. Android runtime is responsible for scheduling and management of the Android system.

The core library includes two parts. One of the parts is a performance function that needs to be invoked in the Java language, and the other part is a core library of Android.

The application layer and the application framework layer run on the virtual machine. The virtual machine executes Java files at the application layer and the application framework layer as binary files. The virtual machine is configured to implement functions such as object life cycle management, stack management, thread management, safety and exception management, and garbage collection.

The system library may include a plurality of functional modules, for example, a surface manager, a media library, a three-dimensional graphics processing library (for example, OpenGL ES), and a 2D graphics engine (for example, SGL)

The surface manager is used to manage a display subsystem and provide fusion of 2D and 3D layers for a plurality of applications.

The media library supports play and recording of a plurality of commonly used audio and video formats, static image files, and the like. The media library may support a plurality of audio and video encoding formats, for example, MPEG-4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

An example of a working procedure of software and hardware of the electronic device 100 is described below with reference to a scenario of determining natural illumination duration.

A service provided by the natural illumination application at the application layer resides in the background of the electronic device 100. The service enables, by using the sensor driver at the kernel layer, the ultraviolet light sensor 180C to periodically collect ultraviolet intensity at a location of a user. When determining that the ultraviolet intensity is greater than or equal to the first threshold, the processor 110 counts duration of current natural illumination on the user to the cumulative natural illumination duration. When determining that the ultraviolet intensity is less than the first threshold, the service enables, by using the sensor driver at the kernel layer, the illuminance sensor 180D to collect illumination intensity at the location of the user. When determining that the illumination intensity is greater than or equal to the second threshold, the processor 110 counts duration of current natural illumination on the user to the cumulative natural illumination duration. When it is determined that the illumination intensity is less than the second threshold, whether a condition that the ultraviolet intensity is greater than or equal to a third threshold and the illumination intensity is greater than or equal to a fourth threshold is satisfied is determined. After it is determined that the condition is satisfied, duration of current natural illumination on the user is counted towards the cumulative natural illumination duration. Otherwise, if either of the foregoing conditions is satisfied, the current natural illumination duration is not counted towards the cumulative natural illumination duration.

In one embodiment, when either of the foregoing conditions is satisfied, the positioning module 196 may be further enabled to determine the locating signal strength. When determining that the locating signal strength is greater than or equal to the fifth threshold, or is less than the fifth threshold and greater than or equal to the sixth threshold, the processor 110 counts duration of current natural illumination on the user to the cumulative natural illumination duration. Otherwise, the current natural illumination duration is not counted towards the cumulative natural illumination duration.

In one embodiment, before the foregoing working procedure is performed, the weather application at the application layer initiates a positioning request, invokes an API interface at the application framework layer, starts a positioning service thread, and enables the positioning module by using a driver at the kernel layer, to locate the electronic device 100. Then, the weather application determines, based on a current location of the electronic device 100, sunrise time and sunset time at the location of the electronic device 100. The processor 110 further obtains current system time, and then determines, based on the sunrise time and the sunset time determined by the weather application, whether the current system time is between the sunrise time and the sunset time. If the current system time is between the sunrise time and the sunset time, the processor 110 enables a function of determining natural illumination duration, that is, starts a service of the natural illumination application. Otherwise, a function of determining natural illumination duration is not enabled.

First, to implement the method for determining illumination duration provided in embodiments of this application, a plurality of thresholds are preset in the electronic device, so that the electronic device runs statistics on natural illumination duration, for example, determines when to consider that a user is exposed to natural light and start to count the natural illumination duration; and when to consider that the user is not exposed to natural light and does not count the natural illumination duration.

For example, the plurality of thresholds include a first threshold, a second threshold, a third threshold, a fourth threshold, a fifth threshold, a sixth threshold, and the like. The first threshold indicates high ultraviolet intensity, the second threshold indicates high illumination intensity, the third threshold indicates medium ultraviolet intensity, the fourth threshold indicates medium illumination intensity, the fifth threshold indicates high locating signal strength, and the sixth threshold indicates medium locating signal strength. For example, a locating signal may be a GPS signal, a BeiDou signal, or the like. The locating signal is not specifically limited in this application.

It should be noted that the plurality of preset thresholds are already preset by a developer before the electronic device is delivered from a factory. For example, before the electronic device is delivered from the factory, big data of ultraviolet intensity and illumination intensity in different regions, different seasons, different weather conditions, different environments, and the like is collected, and the collected big data is analyzed, to select and set an ultraviolet intensity threshold and an illumination intensity threshold. In addition, locating signal strength thresholds, for example, the fifth threshold and the sixth threshold, are determined by testing and analyzing locating signal strength in different scenarios such as outdoor, outdoor blocked, indoor without natural illumination, and indoor near-window.

It should be noted that, in the technical solutions provided in embodiments of this application, in an indoor far-from-window scenario, that is, in the indoor scenario without natural illumination, the locating signal strength is close to 0; in the outdoor scenario, the locating signal strength is high; and in the indoor near-window scenario, the locating signal strength is medium. Therefore, the locating signal strength can be used to help identify a current scenario of the user, for example, outdoor, indoor without natural illumination, or indoor near-window.

With reference to specific examples, a procedure of extracting an ultraviolet intensity threshold, an illumination intensity threshold, and a locating signal strength threshold in this application is described below. Table 1 shows example numerical values of ultraviolet intensity, illumination intensity, and locating signal strength collected in different actual test scenarios provided in embodiments of this application.

TABLE 1

| Serial number | Test scenario | | NUMuv | NUMlux | NUMlc |
|---|---|---|---|---|---|
| 1 | Sunlight outdoors | Direct light | 6,600 | 6,990 | — |
| 2 | | Oblique light | 3,000 | 5,150 | — |
| 3 | | Facing away from the light | 1,700 | 3,760 | — |
| 4 | Sunlight indoors near a south-facing window | Directly facing the window | 104 | 6,990 | — |
| 5 | | Diagonally facing the window | 68 | 5,100 | — |
| 6 | | Facing away from the window | 22 | 500 | — |
| 7 | Sunlight indoors near a north-facing window | Directly facing the window | 15 | 1,150 | — |
| 8 | | Diagonally facing the window | 10 | 717 | — |
| 9 | | Facing away from the window | 2 | 165 | >NUMlc medium |

TABLE 1-continued

| Serial number | | Test scenario | NUMuv | NUMlux | NUMlc | |
|---|---|---|---|---|---|---|
| 10 | Indoors with | Direct light | 3 | 1,600 | <NUMlc | medium |
| 11 | incandescent | Oblique light | 1 | 800 | <NUMlc | medium |
| 12 | light | Facing away from the light | 0 | 500 | <NUMlc | medium |
| 13 | Sunlight outdoors blocked by sleeve | Blocked by sleeve | 211 | 15 | >NUMlc | high |

The test scenarios in Table 1 indicate actual scenarios in which the user wearing the electronic device is located in a testing procedure. Not only an indoor scenario and an outdoor scenario are included, but the indoor scenario and the outdoor scenario are further classified, for example, into the sunlight outdoors scenario (including cases of direct light, oblique light, facing away from the light, or the like), the sunlight indoors near a south-facing window scenario (including cases of directly facing the window, diagonally facing the window, facing away from the window, or the like), the sunlight indoors near a north-facing window scenario (including cases of directly facing the window, diagonally facing the window, facing away from the window, or the like), the sunlight outdoors scenario, and the indoors with incandescent light scenario (including cases of direct light, oblique light, facing away from the light, or the like). It should be noted that, in the testing procedure herein, the actual scenario in which the user is located is complex. As shown in Table 1, there are as many as 13 scenarios, which basically cover scenarios in which the user is located in daily life. Clearly, during an actual test, the scenario in which the user is located may be further classified based on different geographic locations, for example, the southern and northern China. NUMuv indicates the ultraviolet intensity, NUMlux indicates the illumination intensity, and NUMlc indicates the locating signal strength. NUMlc high and NUMlc medium indicate preset locating signal strength thresholds, that is, the fifth threshold and the sixth threshold.

For example, as shown in a row indicated by the serial number 1, when the user is in the outdoor scenario and exposed to direct sunlight, a NUMuv value obtained through measurement is 6,600, and a NUMlux value is 6,990. For another example, as shown in a row indicated by the serial number 8, when the user is in the indoors near a north-facing window (that is, an indoor window facing the north) scenario and is diagonally facing the window, a NUMuv value obtained through measurement is 10, and a NUMlux value is 717. For another example, as shown in a row indicated by the serial number 12, when the user is in the indoor scenario and is facing away from incandescent light, a NUMuv value obtained through measurement is 0, a NUMlux value is 500, and a NUMlc value is less than NUMlc medium.

First, NUMluv thresholds and NUMlux thresholds, including the first threshold, the second threshold, the third threshold, and the fourth threshold, are determined according to Table 1. The column of NUMuv is viewed and analyzed, and it is determined that 1,700 is a limit. Therefore, the first threshold is set to 1,700. Therefore, NUMuv high=1,700, that is, the first threshold=1,700. When a NUMuv value obtained through measurement is greater than or equal to 1,700, it may be determined that the user is currently in the outdoor scenario and is exposed to natural light.

The column of NUMlux is viewed and analyzed, and it is determined that 5,100 is a limit. Therefore, the second threshold is set to 5,100. Therefore, NUMlux high=5,100, that is, the second threshold=5,100. When a NUMlux value obtained through measurement is greater than or equal to 5,100, it may be determined that the user is currently in the outdoor scenario and is exposed to natural light.

The column of NUMuv is further viewed, and 10 is another limit of NUMuv. Therefore, the third threshold is set to 10. Therefore, NUMuv medium=10, that is, the third threshold=10. The column of NUMlux is further viewed, and 500 is another limit of NUMlux. Therefore, the fourth threshold is set to 500. Therefore, NUMlux medium=500, that is, the fourth threshold=500. Subsequently, when a NUMuv value obtained through measurement is greater than or equal to 10 and a NUMlux value obtained through measurement is greater than or equal to 500, it may be determined that the user is currently in the indoor near-window scenario and is exposed to natural light.

For another example, as shown in a row indicated by the serial number 13, because the worn electronic device is blocked by a sleeve, a NUMuv value and a NUMlux value obtained through measurement are inaccurate. In this case, whether the user is currently in the indoor scenario or the outdoor scenario may be determined based on a NUMlc value. It can be learned from Table 1 that, when the user is in the outdoor scenario, a NUMlc value obtained through measurement is greater than NUMlc high, that is, greater than the preset fifth threshold. When the user is in the indoor near-window scenario, a NUMlc value obtained through measurement is greater than NUMlc medium, that is, the preset sixth threshold. When the user is in the indoor far-away-from-window scenario, a NUMlc value obtained through measurement is less than NUMlc medium. Therefore, in this scenario, the scenario in which the user is located may be determined based on the locating signal strength.

It should be noted that, in the testing scenario in which the electronic device is blocked by a sleeve in the row indicated by the serial number 13, the sleeve used during data collection is thick clothing, for example, cotton-padded clothing for winter. Such clothing has strong light-blocking performance. Therefore, there are large errors of the ultraviolet intensity and the illumination intensity obtained through measurement. However, when thinner clothing, for example, clothing for summer, is used to block the electronic device, because such clothing has weak light-blocking performance, ultraviolet intensity and illumination intensity obtained through measurement are not greatly different from ultraviolet intensity and illumination intensity measured when the electronic device is not blocked by a sleeve.

Similar to the scenario in which the electronic device is blocked by a sleeve, when the electronic device is placed in a schoolbag, because the electronic device is blocked by the schoolbag, there are also great differences between ultraviolet intensity and illumination intensity obtained through measurement and ultraviolet intensity and illumination intensity at an actual location of the user. Therefore, in this case, the current scenario of the user, for example, outdoor, outdoor blocked, indoor without natural illumination, or indoor near-window, may alternatively be determined based on the locating signal strength.

In conclusion, the thresholds finally obtained based on the foregoing analysis may be shown in Table 2.

TABLE 2

| Level | NUMuv threshold | NUMlux threshold | NUMlc threshold |
|---|---|---|---|
| High | NUMuv high = 1,700 | NUMlux high = 5,100 | NUMlc high |
| Medium | NUMuv medium = 10 | NUMlux medium = 500 | NUMlc medium |

It should be noted that the foregoing numerical values are merely examples for description. When different sensors are used, values obtained through measurement are different. Therefore, the foregoing numerical values do not constitute a specific limitation on the thresholds.

Based on the foregoing thresholds, the electronic device determines the current scenario of the user, and determines, based on the current scenario of the user, whether to start to run statistics on natural illumination duration. For explanation, it should be noted that the current scenario of the user determined by the electronic device based on data obtained by a sensor has a same meaning as a current scenario of the electronic device. Details are not described again below.

In some implementations, the electronic device determines whether ultraviolet intensity at a current location is greater than or equal to the first threshold. When the ultraviolet intensity is greater than or equal to the first threshold, duration of current natural illumination on the user is counted towards the cumulative natural illumination duration. For explanation, it should be understood that the cumulative natural illumination duration is a sum of duration of natural illumination on the user that is counted by the electronic device up to a current moment. For example, the cumulative natural illumination duration may be daily duration of natural illumination on the user that is counted by the electronic device, or may be weekly duration of natural illumination on the user, or may be monthly duration of natural illumination on the user. This is not limited in this application. In one embodiment, the user may further reset the cumulative natural illumination duration.

The ultraviolet intensity is greatly affected by the weather. Generally, the ultraviolet intensity indoors and outdoors is significantly different. Therefore, by determining the ultraviolet intensity, the electronic device can reduce a probability of erroneous determining to some extent, to more accurately determine the scenario in which the user is located.

In this way, the electronic device may compare the ultraviolet intensity currently obtained through measurement with the first threshold; and when determining that the ultraviolet intensity currently obtained through measurement is greater than or equal to the first threshold, may determine that the user is currently outdoors and is being exposed to natural light, and therefore start to count the natural illumination duration. The scenario in which the user is located can be accurately determined, and the natural illumination duration can be effectively determined, to help the user improve vision.

In some other implementations, the electronic device determines whether illumination intensity at the current location is greater than or equal to the second threshold. When the illumination intensity is greater than or equal to the second threshold, duration of current natural illumination on the user is counted towards the cumulative natural illumination duration.

The illumination intensity is greatly affected by strong rays. Illumination intensity of natural light is much higher than illumination intensity of indoor incandescent light. Therefore, illumination intensity indoors and outdoors is significantly different. Therefore, the electronic device may accurately determine, based on the illumination intensity, the scenario in which the user is located.

Therefore, the electronic device may compare the illumination intensity currently obtained through measurement with the second threshold; and when determining that the illumination intensity currently obtained through measurement is greater than the second threshold, may determine that the user is currently outdoors and is being exposed to natural light, and therefore start to count the natural illumination duration. The scenario in which the user is located can be accurately determined, and the natural illumination duration can be effectively determined, to help the user improve vision.

In still other implementations, the electronic device determines whether the ultraviolet intensity at the current location is greater than or equal to the third threshold and whether the illumination intensity at the current location is greater than or equal to the fourth threshold. If the ultraviolet intensity at the current location is greater than or equal to the third threshold and the illumination intensity at the current location is greater than or equal to the fourth threshold, duration of current natural illumination on the user is counted towards the cumulative natural illumination duration. Otherwise, duration of current natural illumination on the user is not counted towards the cumulative natural illumination duration.

Therefore, the electronic device compares the ultraviolet intensity currently obtained through measurement with the third threshold, and compares the illumination intensity with the fourth threshold; and when determining that the current ultraviolet intensity is greater than or equal to the third threshold and the illumination intensity is greater than or equal to the fourth threshold, may determine that the user is currently in the indoor near-window scenario. In this scenario, the user may also be exposed to natural light, and therefore the natural illumination duration starts to be counted. The scenario in which the user is located can be accurately determined, and the natural illumination duration can be effectively determined, to help the user improve vision.

It should be noted that the foregoing implementations may be performed separately, or may be performed in combination with each other.

For example, in a possible combination, the electronic device first determines the ultraviolet intensity at the current location, and when determining that the ultraviolet intensity is greater than or equal to the first threshold, counts duration of current natural illumination on the user towards the cumulative natural illumination duration. When it is determined that the ultraviolet intensity is less than the first threshold, the illumination intensity at the current location is determined. When it is determined that the illumination intensity is greater than or equal to the second threshold, duration of current natural illumination on the user is counted towards the cumulative natural illumination duration. When it is determined that the illumination intensity is less than the second threshold, whether a condition that the ultraviolet intensity is greater than or equal to the third threshold and the illumination intensity is greater than or equal to the fourth threshold is satisfied is determined. When it is determined that the ultraviolet intensity and the illumination intensity satisfy the condition, duration of current natural illumination on the user is counted towards the cumulative natural illumination duration. Otherwise, duration of current natural illumination on the user is not counted towards the cumulative natural illumination duration.

In this manner, when it cannot be determined that the electronic device is in the outdoor scenario based on only the ultraviolet intensity or the illumination intensity, the electronic device further performs determining based on both the ultraviolet intensity and the illumination intensity. If the ultraviolet intensity at the location of the electronic device is greater than or equal to the third threshold, and the illumination intensity is greater than or equal to the fourth threshold, the electronic device determines that the user is currently in the indoor near-window scenario. Compared with a conventional solution in which whether the user is currently indoors or outdoors is determined based on only the ultraviolet intensity or the illumination intensity, in this manner provided in embodiments of this application, when whether the user is in the outdoor scenario cannot be determined, whether the electronic device is in the indoor near-window scenario may be further determined. In the indoor near-window scenario, the user can also be exposed to natural light. Therefore, duration of natural illumination on the user is counted towards the cumulative natural illumination duration. The scenario in which the user is located can be more accurately determined, and the natural illumination duration can be effectively determined, to help the user improve vision.

In another possible combination, the electronic device first determines the illumination intensity at the current location, and when determining that the illumination intensity is greater than or equal to the second threshold, counts duration of current natural illumination on the user towards the cumulative natural illumination duration. When it is determined that the illumination intensity is less than the second threshold, the ultraviolet intensity at the current location is determined; and when it is determined that the ultraviolet intensity is greater than or equal to the first threshold, duration of current natural illumination on the user is counted towards the cumulative natural illumination duration. When it is determined that the ultraviolet intensity is less than the first threshold, whether the condition that the ultraviolet intensity is greater than or equal to the third threshold and the illumination intensity is greater than or equal to the fourth threshold is satisfied is determined. When it is determined that the ultraviolet intensity and the illumination intensity satisfy the condition, duration of current natural illumination on the user is counted towards the cumulative natural illumination duration. Otherwise, duration of current natural illumination on the user is not counted towards the cumulative natural illumination duration.

In another possible implementation, the electronic device first determines the ultraviolet intensity at the current location, and when determining that the ultraviolet intensity is greater than or equal to the first threshold, counts duration of current natural illumination on the user towards the cumulative natural illumination duration. When it is determined that the ultraviolet intensity is less than the first threshold, whether the condition that the ultraviolet intensity is greater than or equal to the third threshold and the illumination intensity is greater than or equal to the fourth threshold is satisfied is determined. When it is determined that the ultraviolet intensity and the illumination intensity satisfy the condition, duration of current natural illumination on the user is counted towards the cumulative natural illumination duration. Otherwise, duration of current natural illumination on the user is not counted towards the cumulative natural illumination duration.

In another possible implementation, the electronic device first determines the illumination intensity at the current location, and when determining that the illumination intensity is greater than or equal to the second threshold, counts duration of current natural illumination on the user towards the cumulative natural illumination duration. When it is determined that the illumination intensity is less than the second threshold, whether a condition that the ultraviolet intensity is greater than or equal to the third threshold and the illumination intensity is greater than or equal to the fourth threshold is satisfied is determined. When it is determined that the ultraviolet intensity and the illumination intensity satisfy the condition, duration of current natural illumination on the user is counted towards the cumulative natural illumination duration. Otherwise, duration of current natural illumination on the user is not counted towards the cumulative natural illumination duration.

It should be noted that, in some scenarios, the foregoing method still cannot identify an exact scenario in which a user is located. For example, although the user is outdoors, because the electronic device worn on the wrist of the user is partly or entirely blocked as the electronic device is worn on the wrist of the user and a sleeve of topwear worn by the user is close to the wrist, the electronic device cannot determine, based on only ultraviolet intensity and/or illumination intensity, that the user is currently outdoors. For another example, although the user is outdoors, because the electronic device is not worn on the user, but is placed in an item, for example, a backpack, a schoolbag, or a bag, the electronic device cannot determine, based on the ultraviolet intensity and/or the illumination intensity, that the user is currently outdoors. For still another example, although the user is indoors and near a window and is being exposed to natural light, because the user is facing away from the window, ultraviolet intensity and/or illumination intensity received by the electronic device worn on the wrist of the user are not strong enough for the electronic device to determine that the user is currently indoors and near a window. Considering that in actual life, there are a plurality of cases in which the electronic device cannot accurately determine a scenario in which a user is located, an embodiment of this application further provides locating signal strength for helping identifying the scenario in which the user is located, to effectively determine natural illumination duration.

In some implementations, when the electronic device determines that the ultraviolet intensity at the location is less than the third threshold and the illumination intensity is less than the fourth threshold, the electronic device determines whether current locating signal strength is greater than or equal to the fifth threshold, or is less than the fifth threshold and greater than or equal to the sixth threshold. If the current locating signal strength is greater than or equal to the fifth threshold, or is less than the fifth threshold and greater than or equal to the sixth threshold, duration of current natural illumination on the user is counted towards the cumulative natural illumination duration. Otherwise, duration of current natural illumination on the user is not counted towards the cumulative natural illumination duration.

In one embodiment, when the user is in the indoor near-window scenario, because the user is facing away from a window, the electronic device is blocked by a sleeve and/or a schoolbag, or for another reason, ultraviolet intensity obtained through measurement is less than the third threshold and illumination intensity obtained through measurement is less than the fourth threshold. In this case, the scenario in which the user is located may be further determined based on the locating signal strength. When it is determined that the current locating signal strength is greater than or equal to the sixth threshold, it may be determined that the user is currently indoors and near a window. It indicates that in this case, the user can also be exposed to natural light, and therefore, natural illumination duration starts to be counted.

In another possible design, when the user is in the outdoor blocked scenario, because the electronic device is blocked by a sleeve or is placed in a schoolbag, ultraviolet intensity obtained through measurement is less than the first threshold and illumination intensity is less than the second threshold, or ultraviolet intensity obtained through measurement is less than the third threshold and illumination intensity is less than the fourth threshold. In this case, the scenario in which the user is located may be further determined based on the locating signal strength. When it is determined that the current locating signal strength is greater than or equal to the fifth threshold, it may be determined that the user is in the outdoor blocked scenario. In this case, the user is exposed to natural light, and therefore, natural illumination duration starts to be counted.

In the embodiments when the ultraviolet intensity at the location of the electronic device is less than the first threshold and the illumination intensity is less than the second threshold, or when the ultraviolet intensity at the location of the electronic device is less than the third threshold and the illumination intensity is less than the fourth threshold, the electronic device collects the locating signal strength at the location, and determines, based on the locating signal strength, that the user is currently in the indoor near-window scenario or the outdoor blocked scenario. Compared with a conventional solution in which the electronic device determines whether a user is currently indoors or outdoors based on only ultraviolet intensity and illumination intensity, in this manner provided in embodiments of this application, a locating intensity signal may be collected for helping the electronic device to determine whether the user is in the indoor near-window scenario, or to determine whether the user is in the outdoor blocked scenario, as the user can also be exposed to natural light in these two scenarios. Therefore, duration of natural illumination on the user is counted towards the cumulative natural illumination duration. The scenario in which the user is located can be accurately determined, and the natural illumination duration can be effectively determined, to help the user improve vision.

It should be noted that sleeve blocking described above means that the electronic device is blocked by thick clothing, for example, clothing for winter. However, when the electronic device is blocked by thin clothing, a function of determining natural illumination duration may be implemented by determining ultraviolet intensity and/or illumination intensity.

In some other implementations, when the electronic device determines that the ultraviolet intensity at the location is less than the third threshold and the illumination intensity is less than the fourth threshold, the electronic device directly determines whether the current locating signal strength is greater than or equal to the sixth threshold. If the current locating signal strength is greater than or equal to the sixth threshold, duration of current natural illumination on the user is counted towards the cumulative natural illumination duration. Otherwise, duration of current natural illumination on the user is not counted towards natural illumination duration on a current day. Therefore, the electronic device only needs to determine whether the locating signal strength at the current location of the user is greater than the sixth threshold, and does not need to compare the locating signal strength with the fifth threshold for determining. When the locating signal strength obtained by the electronic device through measurement is greater than or equal to the sixth threshold, it indicates that the user is currently in the outdoor, outdoor blocked, or indoor near-window scenarios. In this case, regardless of a scenario the user is currently in, the user can be exposed to natural light. Therefore, alternatively, the sixth threshold may be used alone for helping the electronic device to determine the natural illumination duration.

In one embodiment, to further improve accuracy of identifying the scenario in which the user is located, the electronic device may further use a camera to help identify the scenario in which the user is located, for example, indoor without natural illumination, outdoor, indoor near-window, or outdoor blocked. The electronic device may further use a wearing detection technology. When determining that the user is currently wearing the electronic device, the electronic device performs an operation of determining natural illumination duration; or when determining that the user is currently not wearing the electronic device, the electronic device skips performing an operation of determining natural illumination duration.

For example, the wearing detection technology may be implemented through capacitive sensing. A capacitive button is built close to a human body inside the electronic device. When the human body approaches, the electronic device may detect a capacitance change, to determine whether the user is currently wearing the electronic device. Alternatively, the wearing detection technology may be implemented through infrared sensing. An infrared transmitting and receiving apparatus and a processing chip are mounted inside the electronic device, an infrared ray is emitted by using an infrared lamp, and a receiving end receives intensity of the reflected infrared ray, to determine whether the user is currently wearing the electronic device.

It should be noted that the wearing detection technology specifically used for the electronic device is not specifically limited in this application.

After determining the natural illumination duration according to the foregoing method, the electronic device may further store and display the determined natural illumination duration.

With reference to specific accompanying drawings, a display interface related to the method for determining natural illumination duration in embodiments of this application is described below. It should be noted that all interfaces on an electronic device that are described below may be displayed on the display screen 101 shown in FIG. 1 and the display screen 194 shown in FIG. 2.

Figure 4:
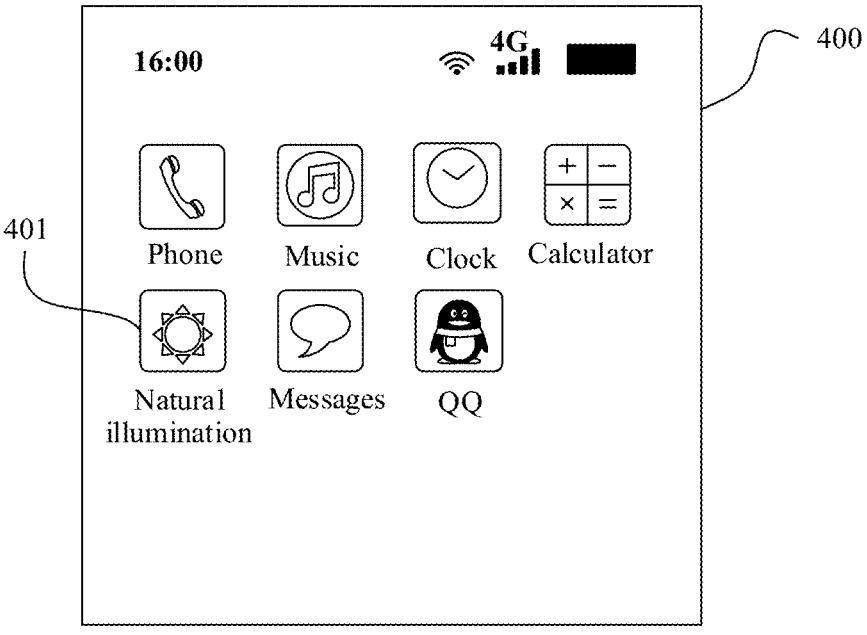
FIG. 4 is a schematic diagram of a main interface on an electronic device according to an embodiment of this application.

For example, in an interface 400 shown in FIG. 4, an application (APP) used to determine natural illumination duration, "Natural illumination" 401, is installed on an electronic device 100. A user may tap an icon of the application 401 to enter interfaces shown in FIG. 5a, FIG. 5b, FIG. 5c, FIG. 5d, and FIG. 8a.

Figure 5A:
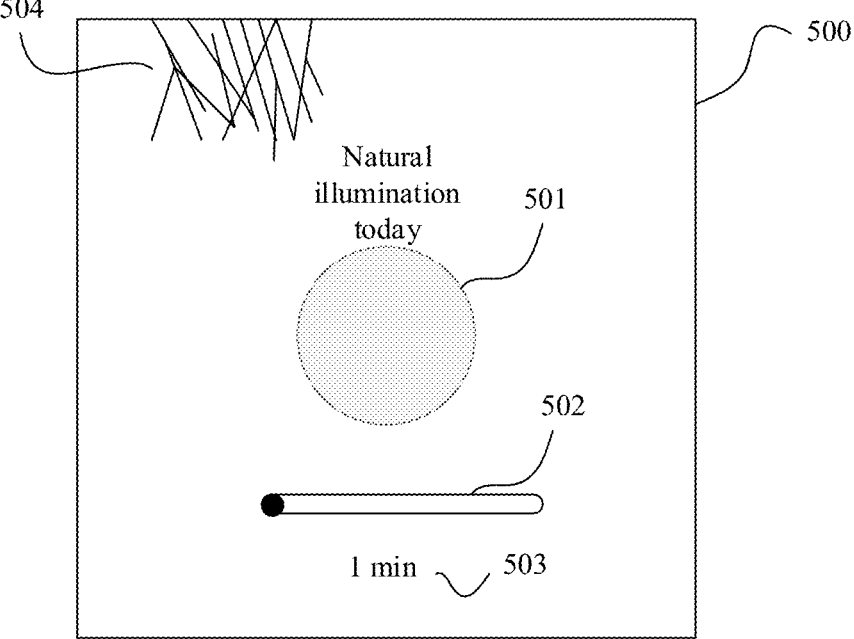
FIG. 5*a* is a schematic diagram of an interface in which an electronic device determines that there is currently natural light according to an embodiment of this application.

When there is natural light, as shown in FIG. 5a, an interface 500 includes an energy ball 501, a progress bar 502, a natural illumination duration statistics module 503, and natural light rays 504. A brightness change of the energy ball corresponds to a progress on the progress bar and duration counted by the natural illumination duration statistics module. A brighter energy ball indicates a faster progression on the progress bar and longer counted duration. As shown in FIG. 5a, there are the natural light rays 504 in a background behind the energy ball 501. Therefore, it indicates that a user is currently exposed to natural light, and up to a current moment, cumulative duration of natural illumination on the user is 1 minute. Herein, the electronic device displays, by default, cumulative duration of natural illumination on the user on a current day.

In one embodiment, as a reminder, words "Natural illumination today" may be further displayed in the interface.

Figure 5B:
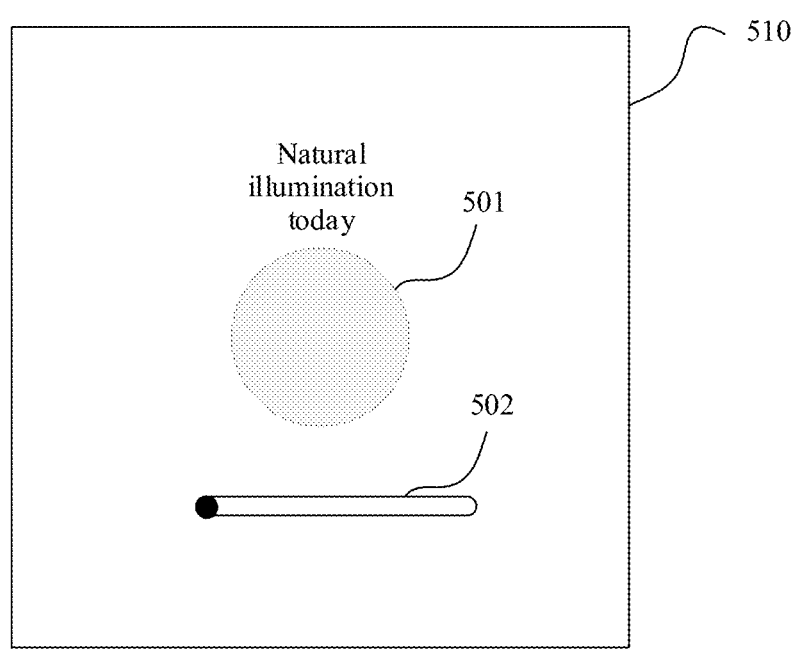
FIG. 5*b* is a schematic diagram of an interface in which an electronic device determines that there is currently no natural light according to an embodiment of this application.

When there is no natural light, as shown in FIG. 5b, in an interface 510, there is no natural light ray 504 in the background behind the energy ball 501. Therefore, it indicates that the user is currently not exposed to natural light.

In one embodiment, when the user is currently not exposed to natural light, the interface 510 may not include the natural illumination duration statistics module 503.

Figure 5C:
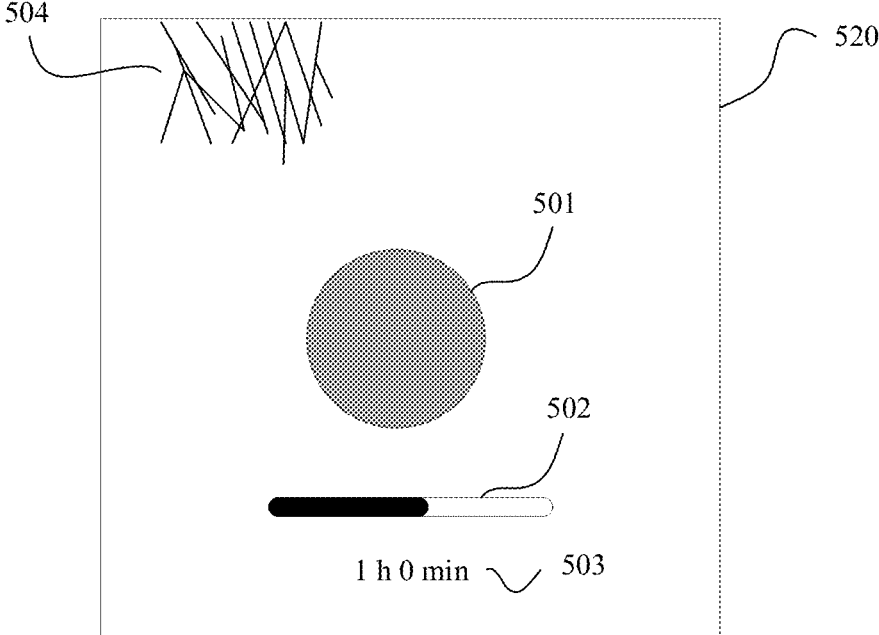
FIG. 5*c* is a schematic diagram of an interface in which an electronic device determines that cumulative natural illumination duration does not reach preset duration according to an embodiment of this application.

As the user is continuously or intermittently exposed to natural light today, in an interface 520 shown in FIG. 5c, brightness of the energy ball 501 becomes increasingly brighter and reaches a medium degree. The natural illumination duration statistics module 503 displays the cumulative duration of natural illumination on the user currently, that is, 1 hour and 0 minutes.

Figure 5D:
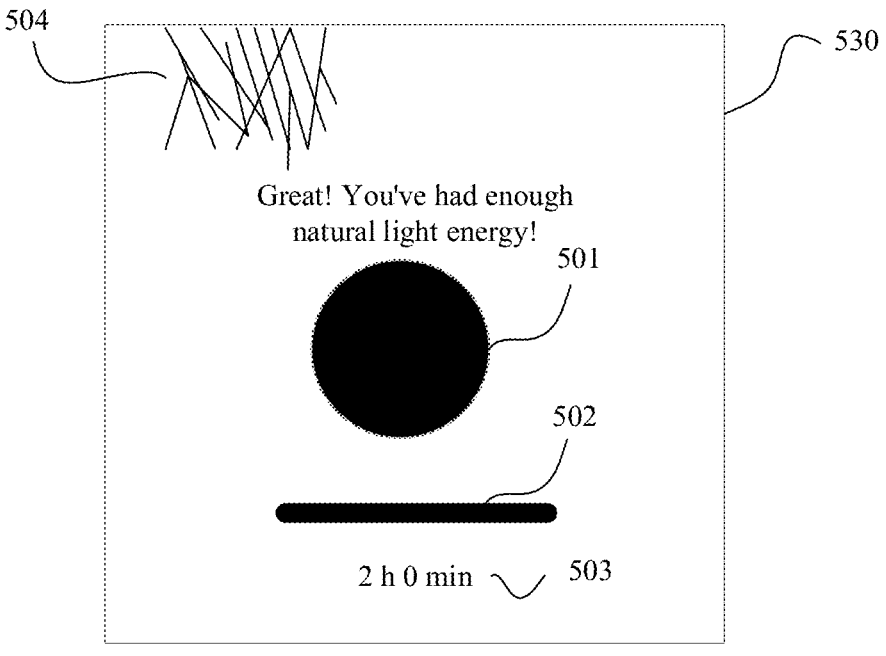
FIG. 5*d* is a schematic diagram of an interface in which an electronic device determines that cumulative natural illumination duration reaches preset duration according to an embodiment of this application.

When the cumulative natural illumination duration reaches preset duration, in an interface 530 shown in FIG. 5d, the brightness of the energy ball 501 reaches a highest degree, and the natural illumination duration statistics module 503 displays the cumulative duration of natural illumination on the user, that is, 2 hours and 0 minutes. In one embodiment, as a reminder, words "Great! You've had enough natural light energy!" may be further displayed in the interface.

For example, the user may set the preset duration by using the natural illumination APP, or may set the preset duration by using a smart care APP described below. A manner of setting the preset duration is not specifically limited in this application.

The electronic device 100 may be an electronic device held by a user A, an electronic device 200 may be an electronic device held by a user B, and an application associated with the electronic device 100, for example, "Smart care", may be installed on the electronic device 200. The user B may view, by using the application, specific circumstances of how the user A has been exposed to natural light. It should be noted that "Smart care" is merely a name, and does not constitute a limitation on a function of the application. The application may also have another name. This is not limited in this application.

In one embodiment, the user A and the user B may be a same user. When the user A and the user B are a same user, the user may alternatively view, by using the smart care APP on the electronic device 200, specific circumstances of how the user using the electronic device 100 has been exposed to natural light.

In one embodiment, the user A and the user B may alternatively be different users. For example, the user A is a child and the user B is a parent. The parent may view, by using the electronic device 200, specific circumstances of how the child has been exposed to natural light at any time, to further ensure that the child has been exposed to natural light long enough, thereby helping the teenager improve vision and promoting physical growth of the child.

An example in which the user A is a child and the user B is a parent is used below to describe examples of display interfaces on the electronic device 100 and the electronic device 200.

The electronic device 200 may be a terminal device that has a speech recognition function, for example, a mobile phone, a tablet computer, a vehicle-mounted device, an augmented reality (AR)/virtual reality (VR) device, a notebook computer, an ultra-mobile personal computer (UMPC), a netbook, a personal digital assistant (PDA), an artificial intelligence device, or a wearable. A specific type of the electronic device 200 is not limited in embodiments of this application. For a hardware structure and a software structure of the electronic device 200, refer to the hardware structure and the software structure of the electronic device 100 described above. Details are not described herein again in this application.

Figure 6:
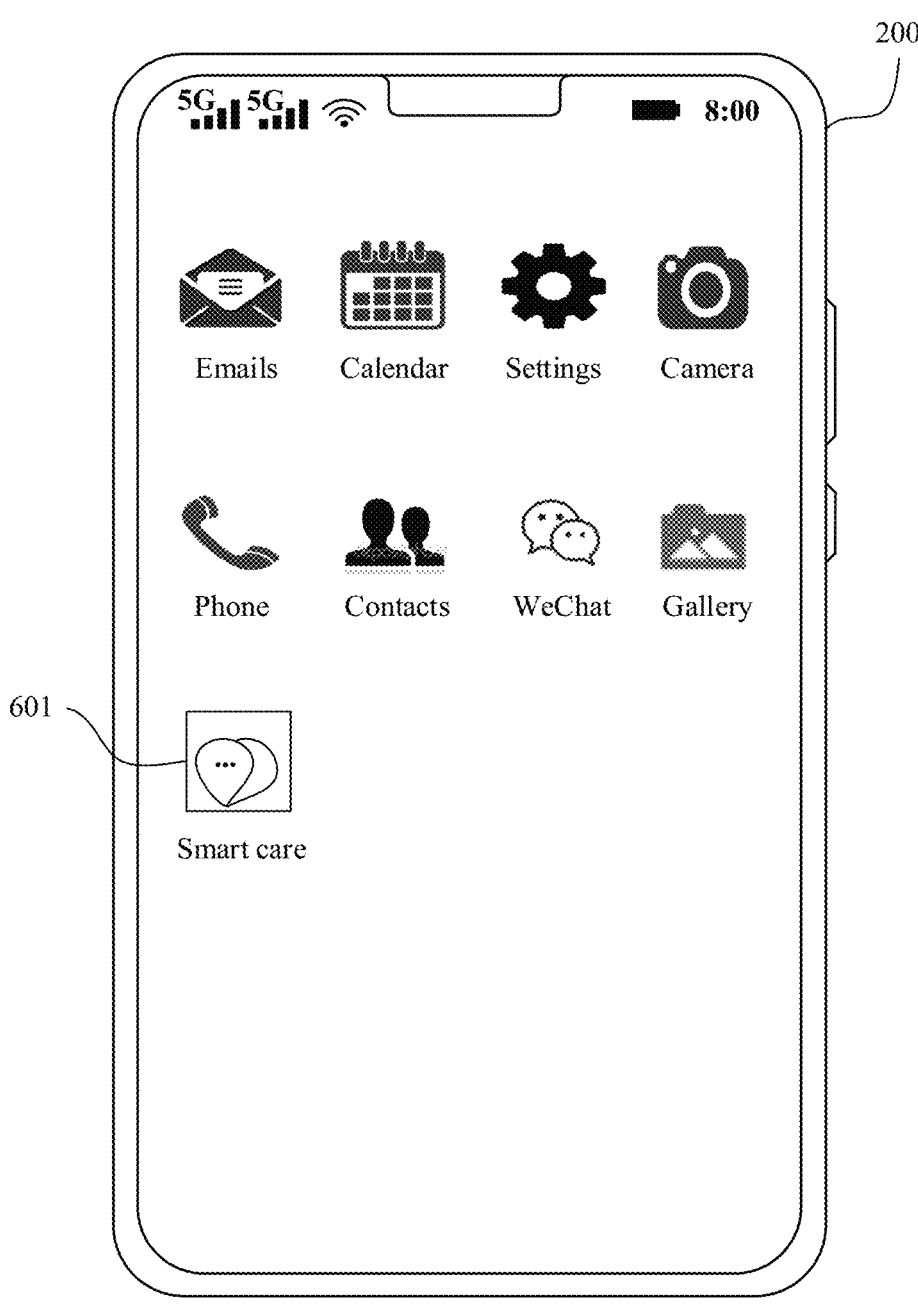
FIG. 6 is a schematic diagram of another main interface on an electronic device according to an embodiment of this application.

For example, the electronic device 200 is a mobile phone. FIG. 6 is a schematic diagram of a display interface on the electronic device 200. A plurality of applications, including Camera, WeChat, Calendar, Smart care, and the like, are installed on the electronic device 200.

The parent may view, by tapping an icon of Smart care 601 in the electronic device 200, specific circumstances of how the child is currently exposed to natural light. A running interface of the smart care APP on the electronic device 200 is described below with reference to the accompanying drawings.

Figure 7A:
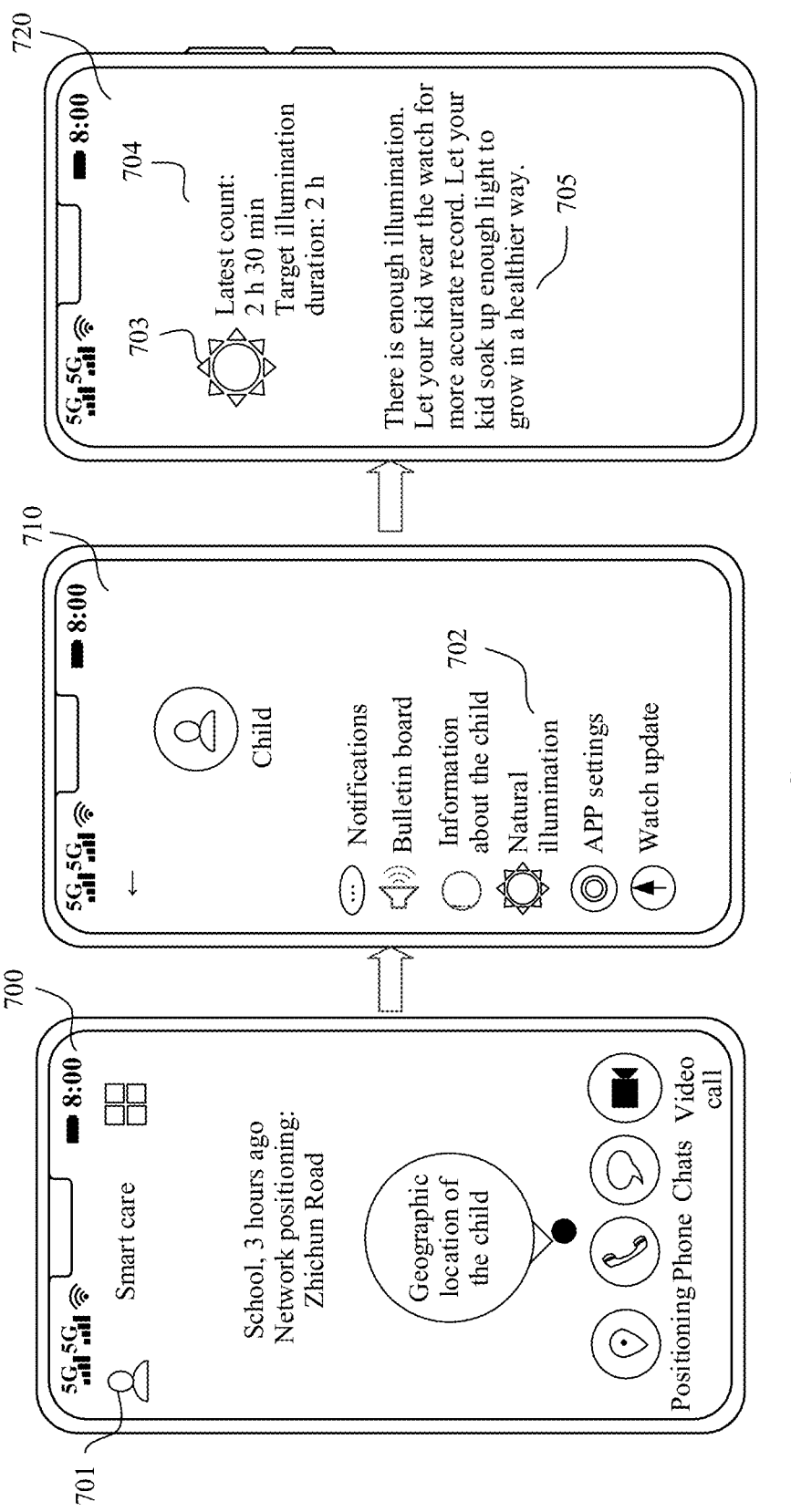
FIG. 7*a* is a schematic diagram of another related interface in which cumulative natural illumination duration is displayed by an electronic device according to an embodiment of this application.

For example, an interface 720 shown in FIG. 7a shows a schematic diagram of an interface on an electronic device 200 that displays natural illumination duration according to an embodiment of this application. For example, the user taps the icon of Smart care 601 in FIG. 6, to enter an interface 700 shown in FIG. 7a. In the interface, the electronic device 200 may display a geographic location of the child. A user module 701 in the interface 700 is tapped to enter an interface 710, and in the interface 710, information about the child may be viewed, and another operation may be performed. A natural illumination module 702 in the interface 710 may be tapped to enter an interface 720, where the interface 720 includes a sun symbol 703, a natural illumination duration statistics module 704, and a reminder module 705. It can be learned from the interface 720 shown in FIG. 7a that cumulative natural illumination duration is 2 hours and 30 minutes currently.

It should be noted that the natural illumination duration in the interface 720 that is counted by the natural illumination duration statistics module 704 is consistent with natural illumination duration counted on the side of the electronic device 100. In addition, "Target illumination duration: 2 hours" in FIG. 7a means that the user sets daily target natural illumination duration to two hours. The duration is merely an example for description. In actual application, the user may set the duration based on an actual requirement, for example, to 3 hours each day, 4 hours each day, 14 hours each week, or 20 hours each week. The user may set how long natural illumination should be for each day, or may set how long natural illumination should be for each week. This is not specifically limited in this application. In one embodiment, the user may further set the target duration on the side of the electronic device 100 and/or on the side of the electronic device 200. This is not specifically limited in this application.

Figure 7B:
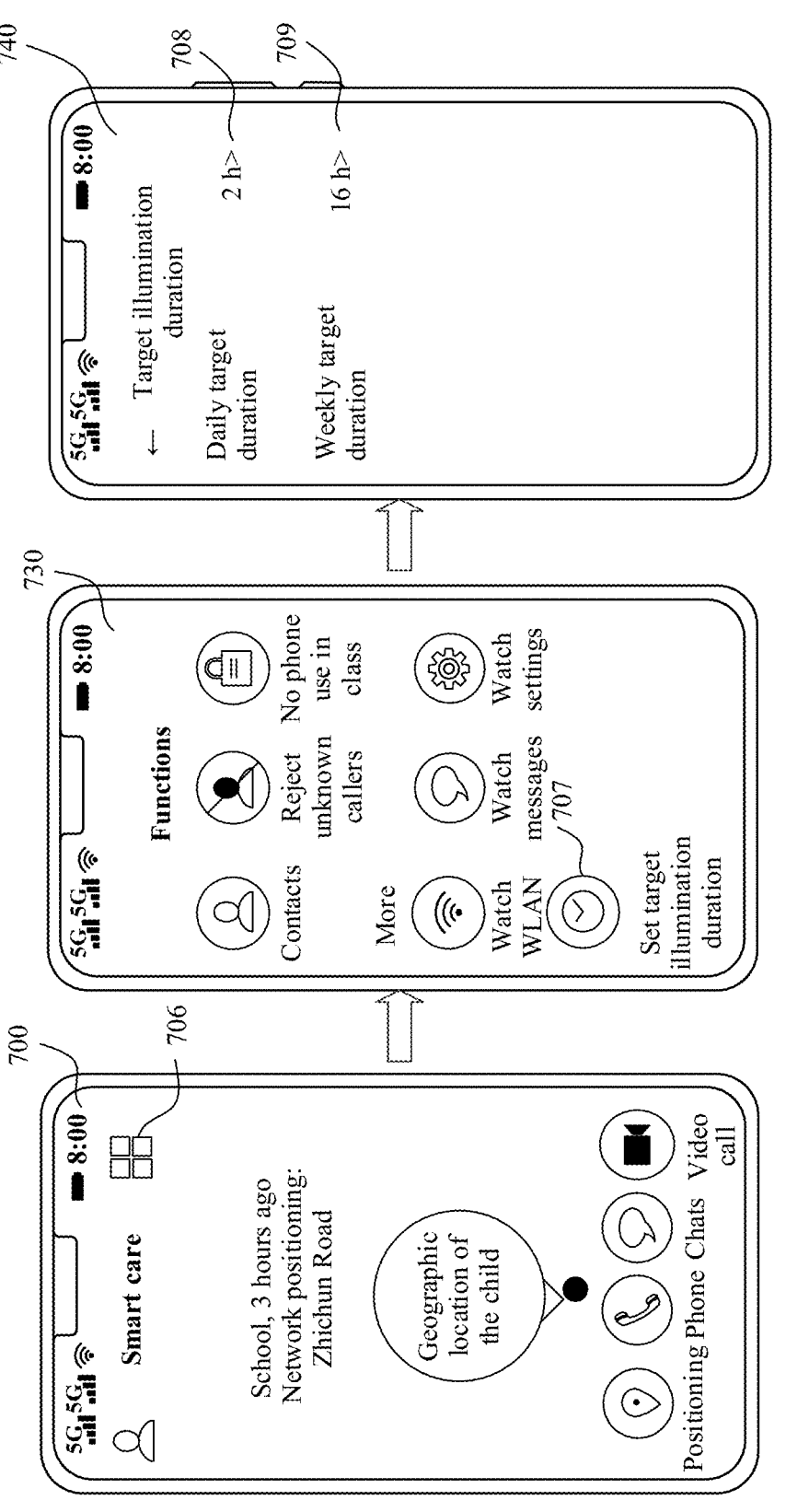
FIG. 7*b* is a schematic diagram of a related interface in which specified target natural illumination duration is displayed by an electronic device according to an embodiment of this application.

For example, FIG. 7b is a schematic diagram of an interface for setting the target duration according to an embodiment of this application. For example, the user taps a function button 706 in the interface 700 shown in FIG. 7a, to enter an interface 730. In the interface 730, the parent may perform some operations on the watch worn by the child, for example, view contacts and SMS messages, and forbidding watch use during class. A target illumination duration setting icon 707 is tapped to enter an interface 740. In the interface 740, the user may set the target illumination duration. For example, a daily target duration module 708 is used to set how long the child needs to be exposed to natural light for each day, and a weekly target duration module 709 is used to set how long the child needs to be exposed to natural light for each week, and the like.

In one embodiment, to further help the user improve vision, the electronic device 100 and the electronic device 200 provided in embodiments of this application may further provide an outdoor activity reminder function for the user.

Figure 8A:
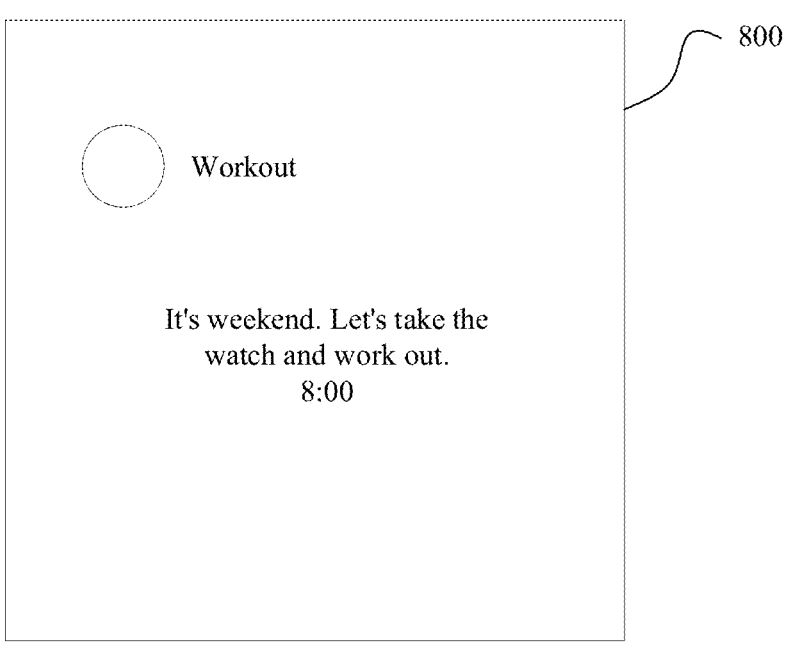
FIG. 8*a* is a schematic diagram of an interface in which an electronic device displays an outdoor activity reminder according to an embodiment of this application.

For example, it is assumed that the user sets daily natural illumination duration to two hours, and the natural illumination APP enables the outdoor activity reminder function, or the smart care APP enables the outdoor activity reminder function of the natural illumination APP. When determining that the cumulative natural illumination duration has not reached the preset duration, the electronic device 100 may remind the user of an outdoor activity. FIG. 8a is a schematic diagram of an interface in which the electronic device 100 displays an outdoor activity reminder according to an embodiment of this application. As shown in an interface 800 in FIG. 8a, the interface 800 includes reminder content, that is, words "It's weekend. Let's take the watch and work out." and a reminder time "8:00". In one embodiment, words such as "Workout" may be further included.

Figure 8B:
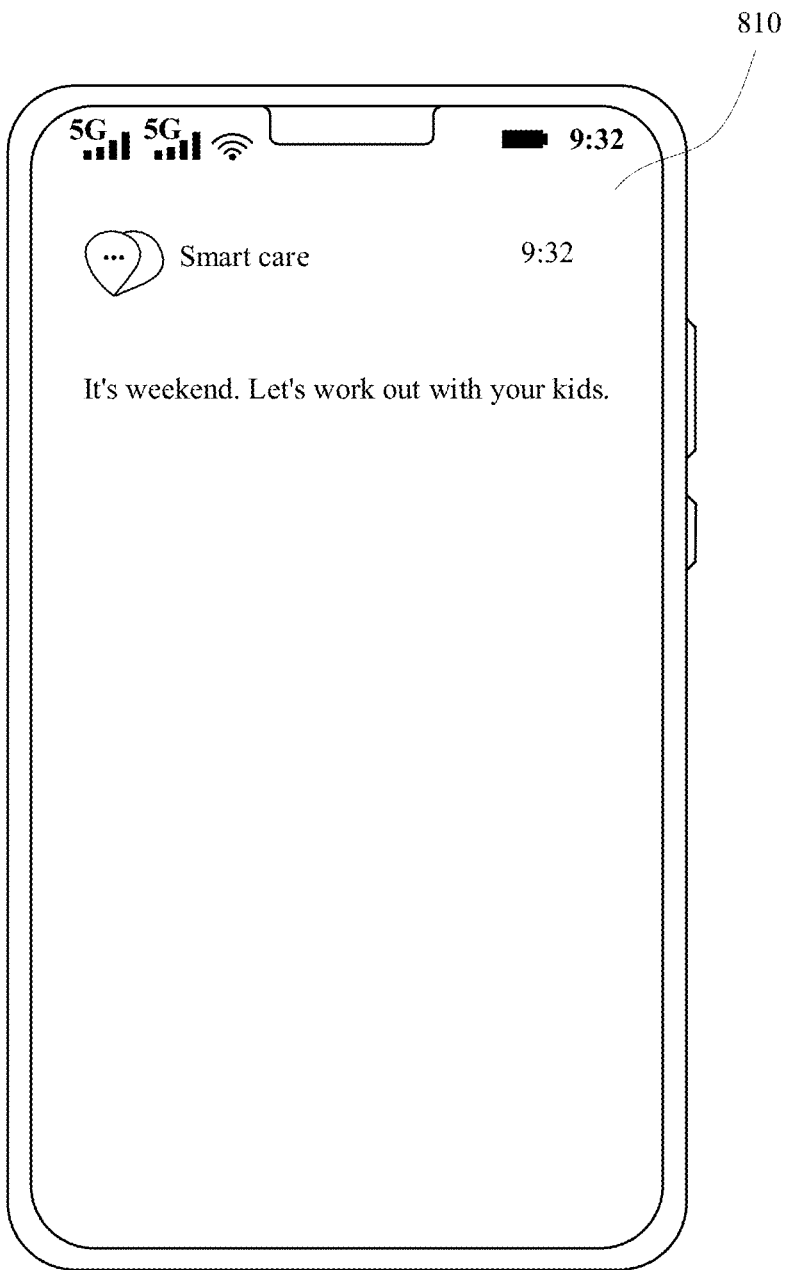
FIG. 8*b* is a schematic diagram of another interface in which an electronic device displays an outdoor activity reminder according to an embodiment of this application.

For example, it is assumed that the user sets daily natural illumination duration to two hours, and the smart care APP enables an outdoor activity reminder function. When determining that cumulative natural illumination duration has not reached the preset duration, the electronic device 200 may remind the user of the outdoor activity. FIG. 8b is a schematic diagram of an interface in which the electronic device 200 displays an outdoor activity reminder according to an embodiment of this application. As shown in an interface 810 in FIG. 8b, the interface 810 includes reminder content, that is, words "It's weekend. Let's work out with your kids." and a reminder time "9:32". In one embodiment, words "Smart care", an icon of Smart care, and the like may be further included.

It should be noted that a manner of enabling the outdoor activity reminder function is not specifically limited in this application.

In one embodiment, an outdoor activity reminder shown in FIG. 8a or FIG. 8b may remind the user periodically. For example, the user is reminded every three hours from 6:00 a.m. to 6:00 p.m. on Saturday and/or Sunday. Alternatively, the user may be reminded at a particular time, for example, the user is reminded at 9:00 a.m. and 3:00 p.m. on Saturday and/or Sunday. Alternatively, the user is reminded each time the user opens the natural illumination APP on the electronic device 100 and the smart care APP on the electronic device 200. Alternatively, the user is reminded when there are still four hours left on a current day before sunset and natural daylight hours are less than two hours. A time, a quantity of times, and a manner of reminding the user by using the electronic device 100 and/or the electronic device 200 are not limited in this application.

In one embodiment, after the electronic device 100 and/or the electronic device 200 reminds the user, if it is detected that duration of natural illumination on the user has reached target illumination duration set by the user, the electronic device may stop reminding the user of the outdoor activity. Alternatively, when the electronic device 100 and/or the electronic device 200 detect/detects that duration of natural illumination on the user has currently reached pre-specified target illumination duration, the electronic device may directly skip reminding the user of the outdoor activity.

It should be noted that the interfaces shown in FIG. 8a and FIG. 8b may be displayed on home screens of the electronic device 100 and the electronic device 200, running interfaces of other applications, or running interfaces of the natural illumination APP and the smart care APP. A location and a manner of displaying the interfaces shown in FIG. 8a and FIG. 8b are not specifically limited in this application.

It should be noted that the foregoing schematic diagrams of interfaces are merely examples for description. In actual design, more and/or less content than that in the foregoing interfaces may be included. This is not limited in this application.

Figures 9, 10:
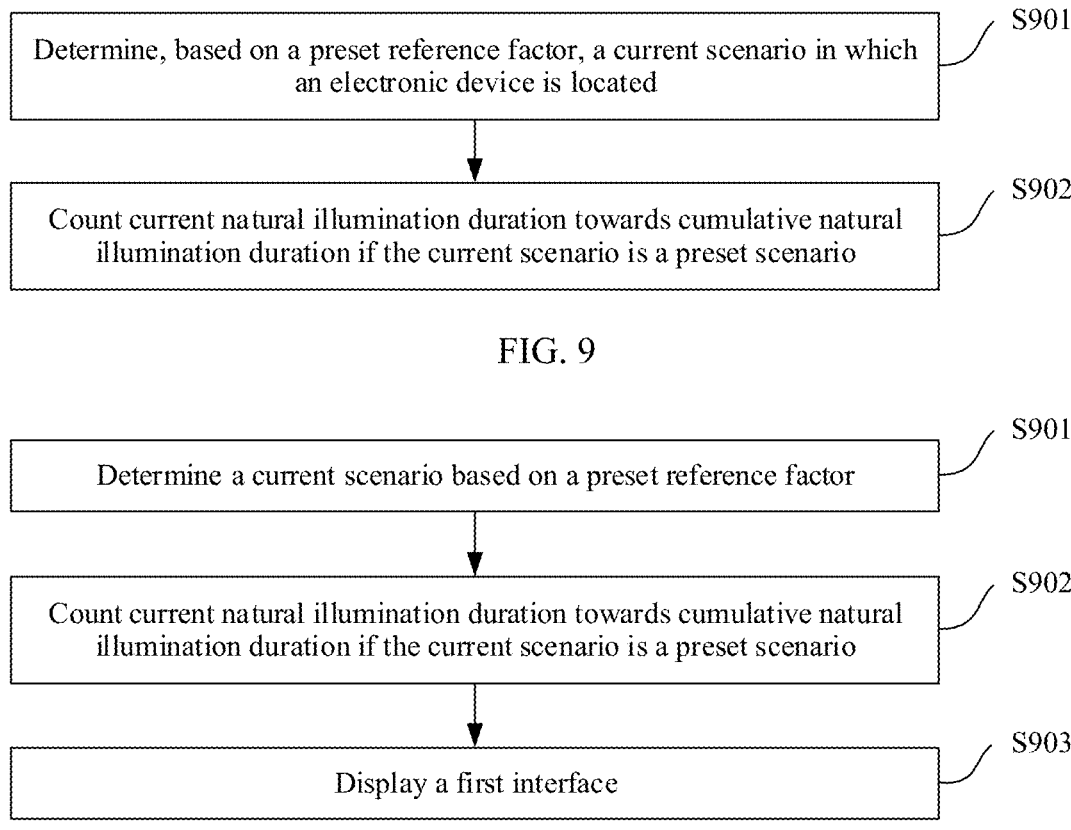
FIG. 9 is a schematic flowchart of a method for determining natural illumination duration according to an embodiment of this application.
FIG. 10 is a schematic flowchart of another method for determining natural illumination duration according to an embodiment of this application.

For example, FIG. 9 is a schematic flowchart of a method for determining natural illumination duration according to an embodiment of this application. The method may be applied to an electronic device having a display screen. The method includes the following steps.

S901: Determine, based on a preset reference factor, a current scenario in which the electronic device is located.

The preset reference factor includes any one or more of ultraviolet intensity, illumination intensity, and locating signal strength.

The preset reference factor includes the ultraviolet intensity, and whether ultraviolet intensity at a current location of the electronic device is greater than or equal to a first threshold is determined. If the ultraviolet intensity is greater than or equal to the first threshold, it is determined that the electronic device is currently in an outdoor scenario. The first threshold is a preset ultraviolet intensity threshold NUMuv high, namely, high ultraviolet intensity.

In addition/alternatively, the preset reference factor includes the illumination intensity, and whether illumination intensity at the current location of the electronic device is greater than or equal to a second threshold is determined. If the illumination intensity is greater than or equal to the second threshold, it is determined that the electronic device is currently in the outdoor scenario. The second threshold is the preset illumination intensity threshold NUMlux high described above.

In addition/alternatively, the preset reference factor includes the ultraviolet intensity and the illumination intensity, and whether the ultraviolet intensity at the current location of the electronic device is greater than or equal to a third threshold and whether the illumination intensity is greater than or equal to a fourth threshold is determined. If the ultraviolet intensity is greater than or equal to the third threshold and the illumination intensity is greater than or equal to the fourth threshold, it is determined that the electronic device is currently in an indoor near-window scenario. If the ultraviolet intensity at the current location is less than the third threshold and/or the illumination intensity is less than the fourth threshold, it is determined that the electronic device is currently in an indoor scenario without natural illumination. The third threshold is the preset ultraviolet intensity threshold NUMuv medium described above, and the fourth threshold is the preset illumination intensity threshold NUMlux medium described above. The third threshold is less than the first threshold, and the fourth threshold is less than the second threshold.

In one embodiment, when the electronic device cannot accurately identify the current scenario based on the ultraviolet intensity and/or the illumination intensity, the locating signal strength may be further used to help identify a scenario in which a user is located, to more accurately determine the natural illumination duration.

For example, the preset reference signal includes the locating signal strength, and whether locating signal strength at the current location of the electronic device is greater than or equal to a fifth threshold is determined. If the locating signal strength is greater than or equal to the fifth threshold, it is determined that the electronic device is currently in the outdoor scenario. The fifth threshold is the preset locating signal strength threshold NUMlc high described above.

In addition/alternatively, the preset reference factor includes the locating signal strength, and whether the locating signal strength at the current location of the electronic device is less than the fifth threshold and greater than or equal to a sixth threshold is determined. If the locating signal strength is less than the fifth threshold and greater than or equal to the sixth threshold, it is determined that the electronic device is currently in the indoor near-window scenario. If the locating signal strength is less than the sixth threshold, it is determined that the electronic device is currently in the indoor scenario without natural illumination. The sixth threshold is the preset locating signal strength threshold NUMlc medium described above, and the sixth threshold is less than the fifth threshold.

In addition/alternatively, the preset reference factor includes the ultraviolet intensity, the illumination intensity, and the locating signal strength, and whether the ultraviolet intensity at the current location of the electronic device is less than the first threshold, whether the illumination intensity at the current location of the electronic device is less than the second threshold, and whether the locating signal strength at the current location of the electronic device is greater than or equal to the fifth threshold are determined. If the ultraviolet intensity is less than the first threshold, the illumination intensity is less than the second threshold, and the locating signal strength is greater than the fifth threshold, it is determined that the electronic device is currently in an outdoor blocked scenario.

In one embodiment, a locating signal may be any one or more of a GPS signal or a BeiDou signal. A type of the locating signal is not specifically limited in this application.

S902: Count current natural illumination duration towards cumulative natural illumination duration if the current scenario is a preset scenario.

The preset scenario includes any one or more of the outdoor scenario, the indoor near-window scenario, and the outdoor blocked scenario. In the preset scenario, it indicates that the user is currently exposed to natural light. Therefore, duration of natural illumination on the user starts to be counted towards the cumulative natural illumination duration. Otherwise, if the user is not in the preset scenario, it indicates that the user is currently not exposed to natural light. Therefore, duration of natural illumination on the user is not counted towards the cumulative natural illumination duration.

Therefore, the electronic device can accurately determine the scenario in which the user is located according to the foregoing method, and can effectively determine the natural illumination duration, to help the user improve vision.

In one embodiment, step S901 and step S902 may be performed periodically, for example, performed every three seconds. It should be noted that a frequency of performing step S901 and step S902 is not specifically limited in this application and may be set by a developer based on an actual situation.

In one embodiment, the method shown in FIG. 9 may further include the following steps, as shown in FIG. 10.

S903: Display a first interface.

The first interface includes the cumulative natural illumination duration. For example, in response to an input operation performed by the user on the electronic device, for example, the user taps an icon of the application 401 shown in FIG. 4, an interface displaying the cumulative natural illumination duration shown in FIG. 5a, FIG. 5b, FIG. 5c, FIG. 5d, or the like is displayed.

Figure 11:
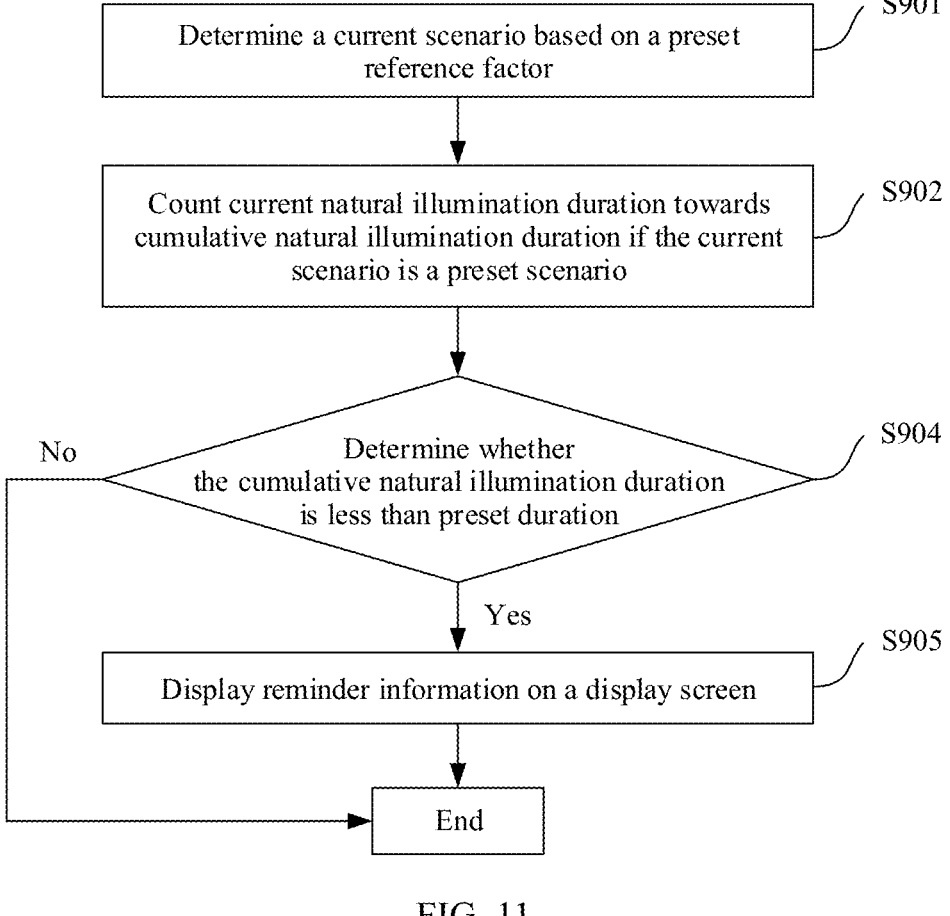
FIG. 11 is a schematic flowchart of another method for determining natural illumination duration according to an embodiment of this application.

In one embodiment, the method shown in FIG. 9 may further include the following steps, as shown in FIG. 11.

S904: Determine whether the cumulative natural illumination duration is less than preset duration.

When the cumulative natural illumination duration is less than the preset duration, step S905 is performed. The cumulative natural illumination duration is a sum of duration of natural illumination on the user that is counted by the electronic device up to a current moment. For example, the cumulative natural illumination duration may be daily duration of natural illumination on the user that is counted by the electronic device, for example, the cumulative duration of natural illumination on the user on a current day that is shown by the natural illumination duration statistics module 503 in FIG. 5a, FIG. 5b, FIG. 5c, and FIG. 5d. Clearly, the cumulative natural illumination duration may alternatively be weekly duration of natural illumination on the user, or monthly duration of natural illumination on the user. The preset duration is natural illumination duration that is needed and that is set by the user. For a method for setting the preset duration, refer to the foregoing method for setting the preset duration. Details are not described herein again.

S905: Display reminder information on the display screen.

The reminder information is used to remind the user to do an outdoor activity. In one embodiment, the reminder information may be presented by displaying a hint window in an interface, or may be presented in a form of an entire interface. This is not limited in this application. For example, the reminder information may be shown in FIG. 8a.

In one embodiment, the method shown in FIG. 9 may further include steps S903, S904, and S905. This is not limited in this application.

It should be noted that the schematic diagrams of the methods shown in FIG. 10 and FIG. 11 do not limit an execution sequence of steps S903, S904, and S905. Alternatively, steps S903, S904, and S905 may be performed simultaneously with steps S901 and S902. This is not limited in this application.

In one embodiment, the electronic device may display the first interface and/or the reminder information, or the electronic device may indicate another electronic device to display the first interface and/or the reminder information. This is not limited in this application.

For example, the electronic device is the electronic device 100 described above, and the another electronic device is the electronic device 200 described above. The electronic device 100 may indicate the electronic device 200 to display the first interface and/or the reminder information. For example, in this manner, the first interface may be the interface 720 shown in FIG. 7*a*, and the reminder information may be shown in FIG. 8*b*.

It should be noted that, for the first interface, a method and time for displaying the reminder information, and specific content, refer to the foregoing descriptions of the related interfaces. Details are not described herein again.

Figure 12:
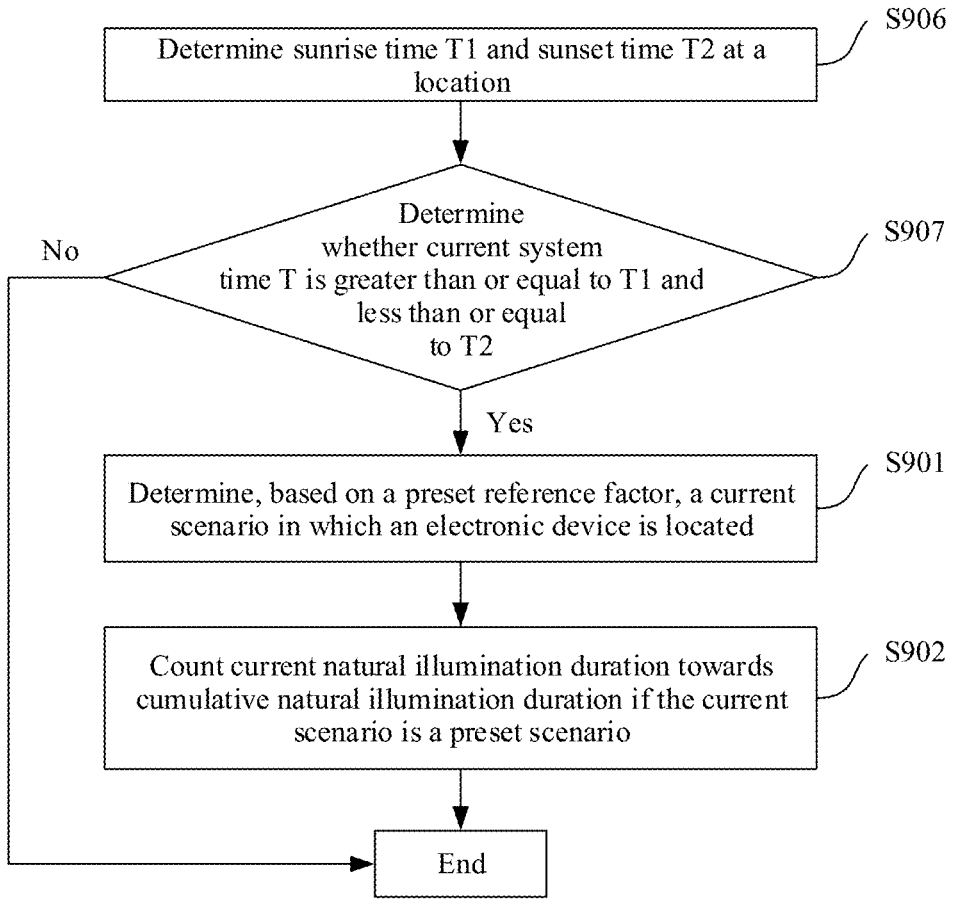
FIG. 12 is a schematic flowchart of another method for determining natural illumination duration according to an embodiment of this application.

In one embodiment, before the electronic device performs step S901, the method shown in FIG. 9 may further include the following steps, as shown in FIG. 12.

S906: Determine sunrise time T1 and sunset time T2 at the location.

When the electronic device is on, the sunrise time T1 and the sunset time T2 at the location of the electronic device are obtained by using a weather service. A time period between T1 and T2 may also be referred to as daylight hours on a current day.

For example, the weather service may determine the current location of the electronic device based on location information provided by a location service, and then determine the sunrise time and the sunset time at the location of the electronic device. In one embodiment, the location service may determine the current location of the electronic device by using a technology, for example, GPS, BeiDou, or network positioning (for example, Wi-Fi or a base station). A positioning technology used by the location service is not specifically limited in this application.

In one embodiment, to further improve accuracy of the daylight hours on the current day determined by the electronic device, the electronic device may further determine a local weather condition, for example, sunny, cloudy, rainy, or the like, by using the weather service, and uses the local weather condition as an auxiliary reference factor for determining the daylight hours on the current day.

S907: Determine whether current system time T is greater than or equal to T1 and less than or equal to T2.

Whether T is between T1 and T2 is determined. If T is between T1 and T2, step S901 is performed. Otherwise, step S901 is not performed.

Therefore, the electronic device determines natural illumination duration only after determining that the current time is within the daylight hours on the current day, so that power consumption of the electronic device can be reduced.

Figure 13:
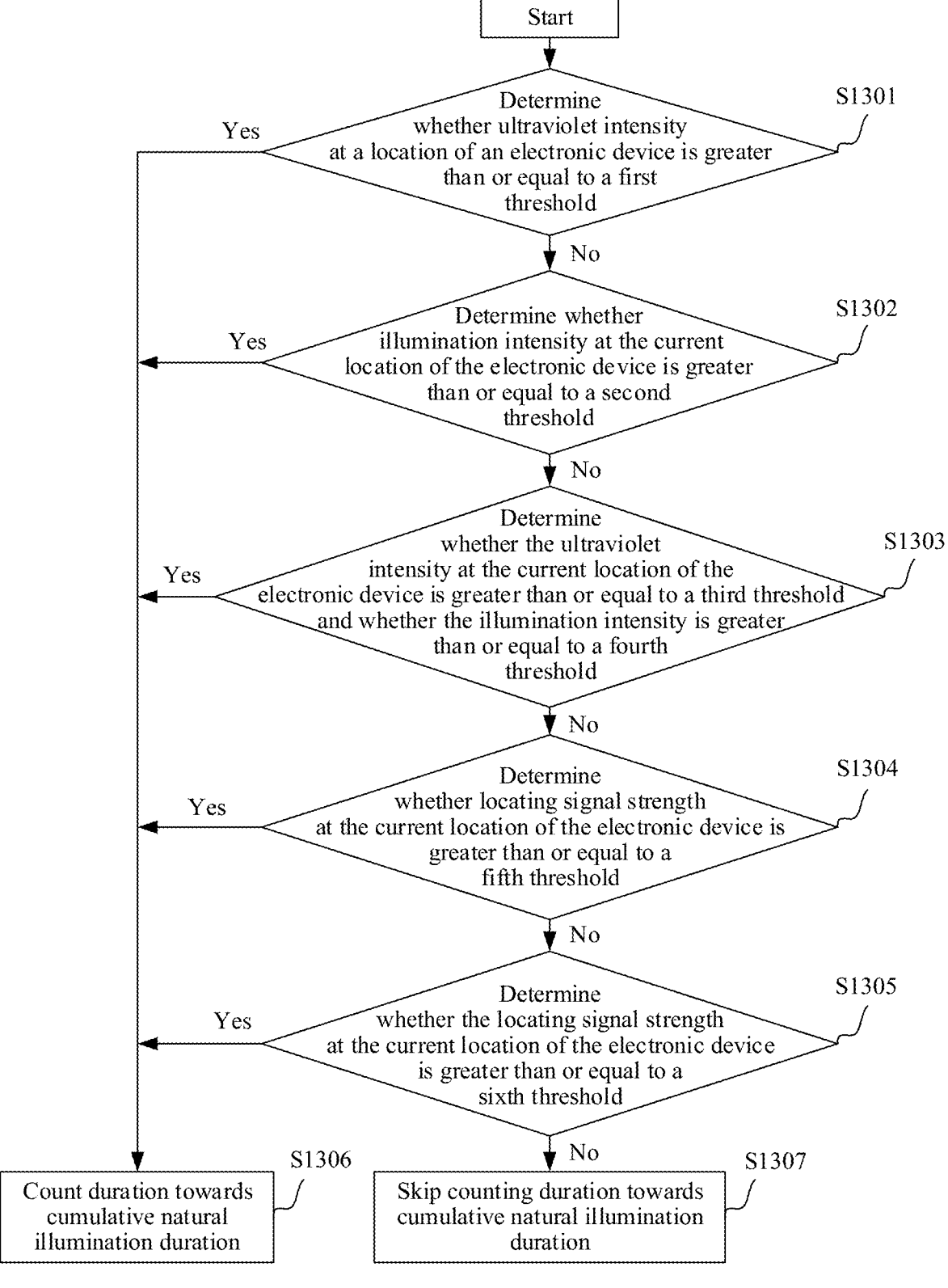
FIG. 13 is a schematic flowchart of another method for determining natural illumination duration according to an embodiment of this application.

For example, FIG. 13 is a schematic flowchart of a method for determining natural illumination duration according to an embodiment of this application. The method includes the following steps.

S1301: Determine whether ultraviolet intensity at a location of an electronic device is greater than or equal to a first threshold.

When the ultraviolet intensity is greater than or equal to the first threshold, it may be determined that the electronic device is currently in an outdoor scenario, and it indicates that a user is being exposed to natural light. In this case, step S1306 is performed. Otherwise, step S1302 is performed.

S1302: Determine whether illumination intensity at a current location of the electronic device is greater than or equal to a second threshold.

When the illumination intensity is greater than or equal to the second threshold, it may be determined that the electronic device is currently in the outdoor scenario, and it indicates that the user is being exposed to natural light. In this case, step S1306 is performed. Otherwise, step S1303 is performed.

It should be noted that an execution sequence of steps S1301 and S1302 may be interchanged. This is not limited in this application.

S1303: Determine whether the ultraviolet intensity at the current location of the electronic device is greater than or equal to a third threshold and whether the illumination intensity is greater than or equal to a fourth threshold.

When the ultraviolet intensity is greater than or equal to the third threshold, and the illumination intensity is greater than or equal to the fourth threshold, it may be determined that the electronic device is currently in an indoor near-window scenario, and it indicates that the user is also being exposed to natural light. In this case, step S1306 is performed. Otherwise, step S1304 is performed.

S1304: Determine whether locating signal strength at the current location of the electronic device is greater than or equal to a fifth threshold.

When the locating signal strength is greater than or equal to the fifth threshold, it may be determined that the electronic device is currently in an outdoor blocked scenario, and it indicates that the user is also being exposed to natural light. In this case, step S1306 is performed. Otherwise, step S1305 is performed.

S1305: Determine whether the locating signal strength at the current location of the electronic device is greater than or equal to a sixth threshold.

When the locating signal strength is greater than or equal to the sixth threshold, it may be determined that the electronic device is currently in the indoor near-window scenario, and it indicates that the user is also being exposed to natural light. In this case, step S1306 is performed. Otherwise, when the locating signal strength is less than the sixth threshold, it may be determined that the electronic device is currently in an indoor scenario without natural illumination, and it indicates that the user is currently not exposed to natural light. In this case, step S1307 is performed.

S1306: Count duration towards cumulative natural illumination duration.

S1307: Skip counting duration towards cumulative natural illumination duration.

It should be noted that, for meanings of the thresholds mentioned in the method shown in FIG. 13, refer to the foregoing descriptions. Details are not described herein again.

In one embodiment, before step S1301, the method shown in FIG. 13 may further include steps S906 and S907 shown in FIG. 12. This is not limited in this application.

Therefore, the electronic device can accurately determine the scenario in which the user is located according to the foregoing method, and can effectively determine the natural illumination duration, to help the user improve vision.

The solutions provided in embodiments of this application are mainly described above from the perspective of the method. It can be understood that, to implement the foregoing functions, the electronic device include a corresponding hardware structure and/or a software module for performing the functions. Units, algorithms, and steps in the examples described with reference to embodiments disclosed in this application can be implemented in a form of hardware or a combination of hardware and computer software in embodiments of this application. Whether a function is performed by hardware or hardware driven by a computer depends on a particular application and a design constraint condition of the technical solutions. A person skilled in the art may use different methods to implement the described functions for each particular application, but it should not be considered that the implementation goes beyond the scope of the technical solutions of embodiments of this application.

In embodiments of this application, functional modules of the electronic device may be divided according to the foregoing method examples. For example, each functional module may be obtained through division based on each corresponding function, or two or more functions may be integrated into one processing unit. The integrated unit may be in a form of hardware, or may be implemented in a form of a software functional module. It should be noted that, in embodiments of this application, the division into the units is an example and is merely logical function division, and may be other division in an actual implementation.

Figure 14:
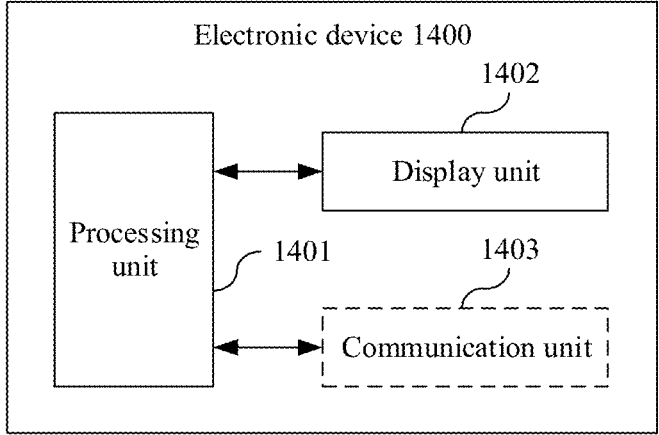
FIG. 14 is a schematic diagram of a structure of another electronic device according to an embodiment of this application.

FIG. 14 is a schematic diagram of a structure of an electronic device according to an embodiment of this application. An electronic device 1400 may be configured to implement the methods described in the foregoing method embodiments. For example, the electronic device 100 may specifically include a processing unit 1401.

The processing unit 1401 is configured to support the electronic device 1400 in performing steps S901 and S902 in FIG. 9 to FIG. 11. In addition/alternatively, the processing unit 1401 is configured to support the electronic device 1400 in performing step S904 in FIG. 11. In addition/alternatively, the processing unit 1401 is configured to support the electronic device 1400 in performing steps S906 and S907 in FIG. 12. In addition/alternatively, the processing unit 1401 is configured to support the electronic device 1400 in performing steps S1301 to S1307 in FIG. 13. In addition/alternatively, the processing unit 1401 is further configured to support the electronic device 1400 in performing another step performed by the electronic device in embodiments of this application.

In one embodiment, the electronic device 1400 shown in FIG. 14 may further include a display unit 1402. The display unit 1402 is configured to support the electronic device 1400 in performing step S903 in FIG. 10. In addition/alternatively, the display unit 1402 is configured to support the electronic device 1400 in performing step S905 in FIG. 11. In addition/alternatively, the display unit 1402 is further configured to support the electronic device 1400 in performing another step performed by the electronic device in embodiments of this application.

In one embodiment, the electronic device 1400 shown in FIG. 14 may further include a communication unit 1403. The communication unit 1403 is configured to support the electronic device 1400 in performing a step of communication between the electronic device and another electronic device in embodiments of this application.

In one embodiment, the electronic device 1400 shown in FIG. 14 may further include a storage unit (not shown in FIG. 14), and the storage unit stores a program or instructions. When the processing unit 1401 executes the program or the instructions, the electronic device 1400 shown in FIG. 14 may be enabled to perform the methods for determining natural illumination duration shown in FIG. 9, FIG. 10, FIG. 11, FIG. 12, and FIG. 13.

For technical effect of the electronic device 1400 shown in FIG. 14, refer to technical effect of the methods for determining natural illumination duration shown in FIG. 9, FIG. 10, FIG. 11, FIG. 12, and FIG. 13. Details are not described herein again. The processing unit 1401 of the electronic device 1400 shown in FIG. 14 may be implemented by a processor or a processor-related circuit component, and may be a processor or a processing module. The communication unit 1403 may be implemented by a transceiver or a transceiver-related circuit component, and may be a transceiver or a transceiver module. The display unit 1402 may be implemented by a display screen-related component, and may include a display screen.

Figure 15:
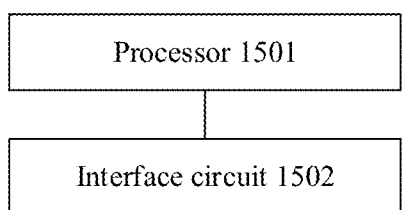
FIG. 15 is a schematic diagram of a structure of another chip system according to an embodiment of this application.

An embodiment of this application further provides a chip system. As shown in FIG. 15, the chip system includes at least one processor 1501 and at least one interface circuit 1502. The processor 1501 and the interface circuit 1502 may be connected to each other through a line. For example, the interface circuit 1502 may be configured to receive a signal from another apparatus. For another example, the interface circuit 1502 may be configured to send a signal to another apparatus (for example, the processor 1501). For example, the interface circuit 1502 may read instructions stored in a memory, and send the instructions to the processor 1501. When the instructions are executed by the processor 1501, an electronic device may be enabled to perform the steps performed by the electronic device in the foregoing embodiments. Clearly, the chip system may further include another discrete device. This is not specifically limited in this embodiment of this application.

In one embodiment, there may be one or more processors in the chip system. The processor may be implemented by hardware, or may be implemented by software. When implemented by hardware, the processor may be a logic circuit, an integrated circuit, or the like. When implemented by software, the processor may be a general-purpose processor and is implemented by reading software code stored in the memory.

In one embodiment, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated on a same chip, or may be disposed separately on different chips. A type of the memory and a manner of disposing the memory and the processor are not specifically limited in this application.

For example, the chip system may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

It should be understood that the steps in the foregoing method embodiments may be implemented by using a hardware integrated logic circuit in the processor or instructions in a form of software. The method and steps disclosed with reference to embodiments of this application may be directly presented as being performed and completed by a hardware processor, or performed and completed by a combination of hardware and software modules in a processor.

An embodiment of this application provides a computer-readable storage medium. The computer-readable storage medium stores a computer program or instructions. When the computer program or the instructions is/are run on a computer, the computer is enabled to perform the methods in the foregoing method embodiments.

An embodiment of this application provides a computer program product. The computer program product includes a computer program or instructions. When the computer program or the instructions is/are run on a computer, the computer is enabled to perform the methods in the foregoing method embodiments.

In addition, an embodiment of this application further provides an apparatus. The apparatus may be specifically a component or a module. The apparatus may include a processor and a memory that are connected to each other. The memory is configured to store computer-executable instructions. When the apparatus runs, the processor may execute the computer-executable instructions stored in the memory, to enable the apparatus to perform the methods in the foregoing method embodiments.

The electronic device, the computer-readable storage medium, the computer program product, and the chip provided in embodiments of this application all are configured to perform the corresponding methods provided above. Therefore, for beneficial effect that can be achieved, refer to the beneficial effect of the corresponding methods provided above. Details are not described herein again.

According to the foregoing descriptions of the implementations, a person skilled in the art may clearly understand that for the purpose of convenient and brief description, division into the foregoing functional modules is merely used as an example for description. In actual application, the foregoing functions can be allocated to different functional modules for implementation based on a requirement. In other words, an inner structure of an apparatus is divided into different functional modules to implement all or some of the functions described above. For a detailed working procedure of the system, the apparatus, and the unit described above, refer to a corresponding procedure in the foregoing method embodiments. Details are not described herein again.

In embodiments provided in this application, it should be understood that the disclosed methods may be implemented in another manner. Various embodiments may be combined or be referred to without conflict. The foregoing electronic device embodiments are merely an example. For example, division into the units or modules is merely logical function division and may be other division in actual implementation. For example, a plurality of units or components may be combined or integrated into another system, or some features may be ignored or not performed. In addition, the displayed or discussed mutual coupling, direct coupling, or communication connection may be implemented through some interfaces. The indirect coupling or the communication connection between the modules or units may be implemented in electronic, mechanical, or another form.

The units described as separate parts may or may not be physically separate, and parts displayed as units may or may not be physical units, and may have one location, or may be distributed over a plurality of network units. All or some of the units may be selected based on an actual requirement, to achieve the objectives of the solutions of embodiments.

In addition, the functional units in embodiments of this application may be integrated into one processing unit, each of the units may exist alone physically, or two or more units are integrated into one unit. The integrated unit may be implemented in a form of hardware, or may be implemented in a form of a software functional unit.

When implemented in the form of a software functional unit and sold or used as an independent product, the integrated unit may be stored in a computer-readable storage medium. Based on such an understanding, the technical solutions of this application essentially, or all or some of the part contributing to the prior art, or some of the technical solutions may be implemented in a form of a software product. The computer software product is stored in a storage medium, and includes several instructions for instructing a computer device (that may be a personal computer, a server, or a network device) or a processor to perform all or some of the steps in the methods described in embodiments of this application. The foregoing storage medium includes any medium that can store program instructions, for example, a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, applied to an electronic device having a display screen, comprising:
   determining, based on a preset reference factor, a current scenario in which the electronic device is located, wherein the preset reference factor comprises at least a locating signal strength; and
   counting a current natural illumination duration towards a cumulative natural illumination duration in response to the current scenario is a preset scenario, wherein
   the preset scenario comprises one or more of an outdoor scenario, an indoor near-window scenario, or an outdoor blocked scenario.

2. The method according to claim 1, further comprising:
   displaying, on the display screen, a first interface comprising the cumulative natural illumination duration.

3. The method according to claim 1, further comprising:
   determining whether the cumulative natural illumination duration is less than a preset duration; and
   displaying reminder information on the display screen if the cumulative natural illumination duration is less than the preset duration, wherein the reminder information is used to remind a user to do an outdoor activity.

4. The method according to claim 1, wherein the preset reference factor further comprises an ultraviolet intensity, and the determining, based on the preset reference factor, the current scenario in which the electronic device is located comprises:
   determining whether the ultraviolet intensity at a current location of the electronic device is greater than or equal to a first threshold; and
   in response to the ultraviolet intensity is greater than or equal to the first threshold, determining that the electronic device is currently in the outdoor scenario, wherein
   the first threshold is a preset ultraviolet intensity threshold.

5. The method according to claim 1, wherein the preset reference factor further comprises an illumination intensity, and the determining, based on the preset reference factor, the current scenario in which the electronic device is located comprises:
   determining whether the illumination intensity at a current location of the electronic device is greater than or equal to a second threshold; and
   in response to the illumination intensity is greater than or equal to the second threshold, determining that the electronic device is currently in the outdoor scenario, wherein
   the second threshold is a preset illumination intensity threshold.

6. The method according to claim 1, wherein the preset reference factor further comprises an ultraviolet intensity and an illumination intensity, and the determining, based on the preset reference factor, the current scenario in which the electronic device is located comprises:

determining whether the ultraviolet intensity at a current location of the electronic device is greater than or equal to a third threshold and whether the illumination intensity at the current location of the electronic device is greater than or equal to a fourth threshold, wherein the third threshold is a preset ultraviolet intensity threshold, the third threshold is less than a first threshold, the fourth threshold is a preset illumination intensity threshold, and the fourth threshold is less than a second threshold; and in response to the ultraviolet intensity is greater than or equal to the third threshold and the illumination intensity is greater than or equal to the fourth threshold, determining that the electronic device is currently in the indoor near-window scenario; or in response to the ultraviolet intensity is less than the third threshold and/or the illumination intensity is less than the fourth threshold, determining that the electronic device is currently in an indoor scenario without natural illumination.

7. The method according to claim 1, wherein the determining, based on the preset reference factor, the current scenario in which the electronic device is located comprises:

determining whether the locating signal strength at a current location of the electronic device is greater than or equal to a fifth threshold, wherein the fifth threshold is a preset locating signal strength threshold; and in response to the locating signal strength is greater than or equal to the fifth threshold, determining that the electronic device is currently in the outdoor scenario.

8. The method according to claim 7, wherein a locating signal is one or more of a global positioning system GPS signal or a BeiDou signal.

9. The method according to claim 1, wherein the determining, based on the preset reference factor, the current scenario in which the electronic device is located comprises:

determining whether the locating signal strength at a current location of the electronic device is less than a fifth threshold and greater than or equal to a sixth threshold; and in response to the locating signal strength is less than the fifth threshold and greater than or equal to the sixth threshold, determining that the electronic device is currently in the indoor near-window scenario, wherein the sixth threshold is a preset locating signal strength threshold, and the sixth threshold is less than the fifth threshold; or in response to the locating signal strength is less than the sixth threshold, determining that the electronic device is currently in an indoor scenario without natural illumination.

10. The method according to claim 1, wherein the preset reference factor further comprises an ultraviolet intensity, and an illumination intensity, and the determining, based on the preset reference factor, the current scenario in which the electronic device is located comprises:

determining whether the ultraviolet intensity at a current location of the electronic device is less than a first threshold, whether the illumination intensity at the current location of the electronic device is less than a second threshold, and whether the locating signal strength at the current location of the electronic device is greater than or equal to a fifth threshold; and in response to the ultraviolet intensity is less than the first threshold, the illumination intensity is less than the second threshold, and the locating signal strength is greater than or equal to the fifth threshold, determining that the electronic device is currently in the outdoor blocked scenario.

11. The method according to claim 1, wherein before the current scenario is determined based on the preset reference factor, the method further comprising:

determining a sunrise time T1 and a sunset time T2 at a location; and determining whether current system time T is greater than or equal to T1 and less than or equal to T2.

12. An electronic device, comprising a processor, a display screen, and a memory, wherein the memory and the display screen are coupled to the processor, the memory is configured to store computer program code, the computer program code comprises computer instructions, which when executed by the processor, cause the electronic device to perform:

determining, based on a preset reference factor, a current scenario in which the electronic device is located, wherein the preset reference factor comprises at least a locating signal strength; and counting a current natural illumination duration towards a cumulative natural illumination duration in response to the current scenario is a preset scenario, wherein the preset scenario comprises one or more of an outdoor scenario, an indoor near-window scenario, or an outdoor blocked scenario.

13. The electronic device, according to claim 12, wherein the electronic device is further to perform:

displaying, on the display screen, a first interface comprising the cumulative natural illumination duration.

14. The electronic device, according to claim 12, wherein the electronic device is further to perform:

determining whether the cumulative natural illumination duration is less than a preset duration; and displaying reminder information on the display screen in response to the cumulative natural illumination duration is less than the preset duration, wherein the reminder information is used to remind a user to do an outdoor activity.

15. The electronic device, according to claim 12, wherein the preset reference factor further comprises an ultraviolet intensity, and the determining, based on the preset reference factor, the current scenario in which the electronic device is located comprises:

determining whether ultraviolet intensity at a current location of the electronic device is greater than or equal to a first threshold; and in response to the ultraviolet intensity is greater than or equal to the first threshold, determining that the electronic device is currently in the outdoor scenario, wherein the first threshold is a preset ultraviolet intensity threshold.

16. The electronic device, according to claim 12, wherein the preset reference factor further comprises an illumination intensity, and the determining, based on the preset reference factor, the current scenario in which the electronic device is located comprises:

determining whether the illumination intensity at a current location of the electronic device is greater than or equal to a second threshold; and in response to the illumination intensity is greater than or equal to the second threshold, determining that the electronic device is currently in the outdoor scenario, wherein the second threshold is a preset illumination intensity threshold.

17. The electronic device, according to claim 12, wherein the preset reference factor further comprises an ultraviolet intensity and an illumination intensity, and the determining, based on the preset reference factor, the current scenario in which the electronic device is located comprises:

determining whether the ultraviolet intensity at a current location of the electronic device is greater than or equal to a third threshold and whether the illumination intensity at the current location of the electronic device is greater than or equal to a fourth threshold, wherein the third threshold is a preset ultraviolet intensity threshold, the third threshold is less than a first threshold, the fourth threshold is a preset illumination intensity threshold, and the fourth threshold is less than a second threshold; and in response to the ultraviolet intensity is greater than or equal to the third threshold and the illumination intensity is greater than or equal to the fourth threshold, determining that the electronic device is currently in the indoor near-window scenario; or in response to the ultraviolet intensity is less than the third threshold and/or the illumination intensity is less than the fourth threshold, determining that the electronic device is currently in an indoor scenario without natural illumination.

18. The electronic device, according to claim 12, wherein the determining, based on the preset reference factor, the current scenario in which the electronic device is located comprises:

determining whether the locating signal strength at a current location of the electronic device is greater than or equal to a fifth threshold, wherein the fifth threshold is a preset locating signal strength threshold; and in response to the locating signal strength is greater than or equal to the fifth threshold, determining that the electronic device is currently in the outdoor scenario.

19. The electronic device, according to claim 12, wherein the determining, based on the preset reference factor, the current scenario in which the electronic device is located comprises:

determining whether the locating signal strength at a current location of the electronic device is less than a fifth threshold and greater than or equal to a sixth threshold; and in response to the locating signal strength is less than the fifth threshold and greater than or equal to the sixth threshold, determining that the electronic device is currently in the indoor near-window scenario, wherein the sixth threshold is a preset locating signal strength threshold, and the sixth threshold is less than the fifth threshold; or in response to the locating signal strength is less than the sixth threshold, determining that the electronic device is currently in an indoor scenario without natural illumination.

20. The electronic device, according to claim 12, wherein the preset reference factor further comprises an ultraviolet intensity, and an illumination intensity and the determining, based on the preset reference factor, the current scenario in which the electronic device is located comprises:

determining whether the ultraviolet intensity at a current location of the electronic device is less than a first threshold, whether the illumination intensity at the current location of the electronic device is less than a second threshold, and whether the locating signal strength at the current location of the electronic device is greater than or equal to a fifth threshold; and in response to the ultraviolet intensity is less than the first threshold, the illumination intensity is less than the second threshold, and the locating signal strength is greater than or equal to the fifth threshold, determining that the electronic device is currently in the outdoor blocked scenario.

* * * * *